(12) United States Patent  (10) Patent No.: US 9,031,384 B2
Konuma et al.  (45) Date of Patent: May 12, 2015

(54) REGION OF INTEREST IDENTIFICATION DEVICE, REGION OF INTEREST IDENTIFICATION METHOD, REGION OF INTEREST IDENTIFICATION PROGRAM, AND REGION OF INTEREST IDENTIFICATION INTEGRATED CIRCUIT

(75) Inventors: Tomohiro Konuma, Osaka (JP); Ryouichi Kawanishi, Kyoto (JP); Tomoyuki Karibe, Osaka (JP); Tsutomu Uenoyama, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 171 days.

(21) Appl. No.: 13/809,480

(22) PCT Filed: Apr. 24, 2012

(86) PCT No.: PCT/JP2012/002788
§ 371 (c)(1),
(2), (4) Date: Jan. 10, 2013

(87) PCT Pub. No.: WO2012/164818
PCT Pub. Date: Dec. 6, 2012

(65) Prior Publication Data
US 2013/0108244 A1 May 2, 2013

(30) Foreign Application Priority Data
Jun. 2, 2011 (JP) .................... 2011-124498

(51) Int. Cl.
*G11B 27/031* (2006.01)
*G10L 25/87* (2013.01)
*G11B 27/28* (2006.01)

(52) U.S. Cl.
CPC ........... *G11B 27/031* (2013.01); *G10L 25/87* (2013.01); *G11B 27/28* (2013.01)

(58) Field of Classification Search
None
See application file for complete search history.

(56) References Cited

U.S. PATENT DOCUMENTS 6,600,874 B1  7/2003 Fujita et al.
(Continued)

FOREIGN PATENT DOCUMENTS

| JP | 3-80782 | 4/1991 |
| JP | 2001-57660 | 2/2001 |
| JP | 2004-191780 | 7/2004 |
| JP | 2005-260391 | 9/2005 |

(Continued)

OTHER PUBLICATIONS

International Search Report issued May 29, 2012 in International (PCT) Application No. PCT/JP2012/002788.

*Primary Examiner* — Hung Dang
*Assistant Examiner* — Sunghyoun Park
(74) *Attorney, Agent, or Firm* — Wenderoth, Lind & Ponack, L.L.P.

(57) ABSTRACT

An interesting section identifying device for identifying an interesting section of a video file based on an audio signal included in the video file, the interesting section being a section in which a user is estimated to express interest, includes an interesting section candidate extracting unit that extracts an interesting section candidate from the video file, the interesting section candidate being a candidate for the interesting section, a detailed structure determining unit that determines whether the interesting section candidate includes a specific detailed structure, and an interesting section identifying unit that identifies the interesting section by analyzing a specific section when the detailed structure determining unit determines that the interesting section candidate includes the detailed structure, the specific section including the detailed structure and being shorter than the interesting section candidate.

21 Claims, 18 Drawing Sheets

(56) References Cited

U.S. PATENT DOCUMENTS

2003/0194210 A1* 10/2003 Shiiyama ................ 386/68
2004/0200337 A1  10/2004 Abe et al.
2005/0190965 A1*  9/2005 Hwang et al. ........... 382/165
2009/0060449 A1*  3/2009 Shinkai et al. ........... 386/46

FOREIGN PATENT DOCUMENTS

| | | |
|---|---|---|
| JP | 3753384 | 3/2006 |
| JP | 2008-124551 | 5/2008 |
| WO | 2010/140355 | 12/2010 |
| WO | 2011/132410 | 10/2011 |

* cited by examiner

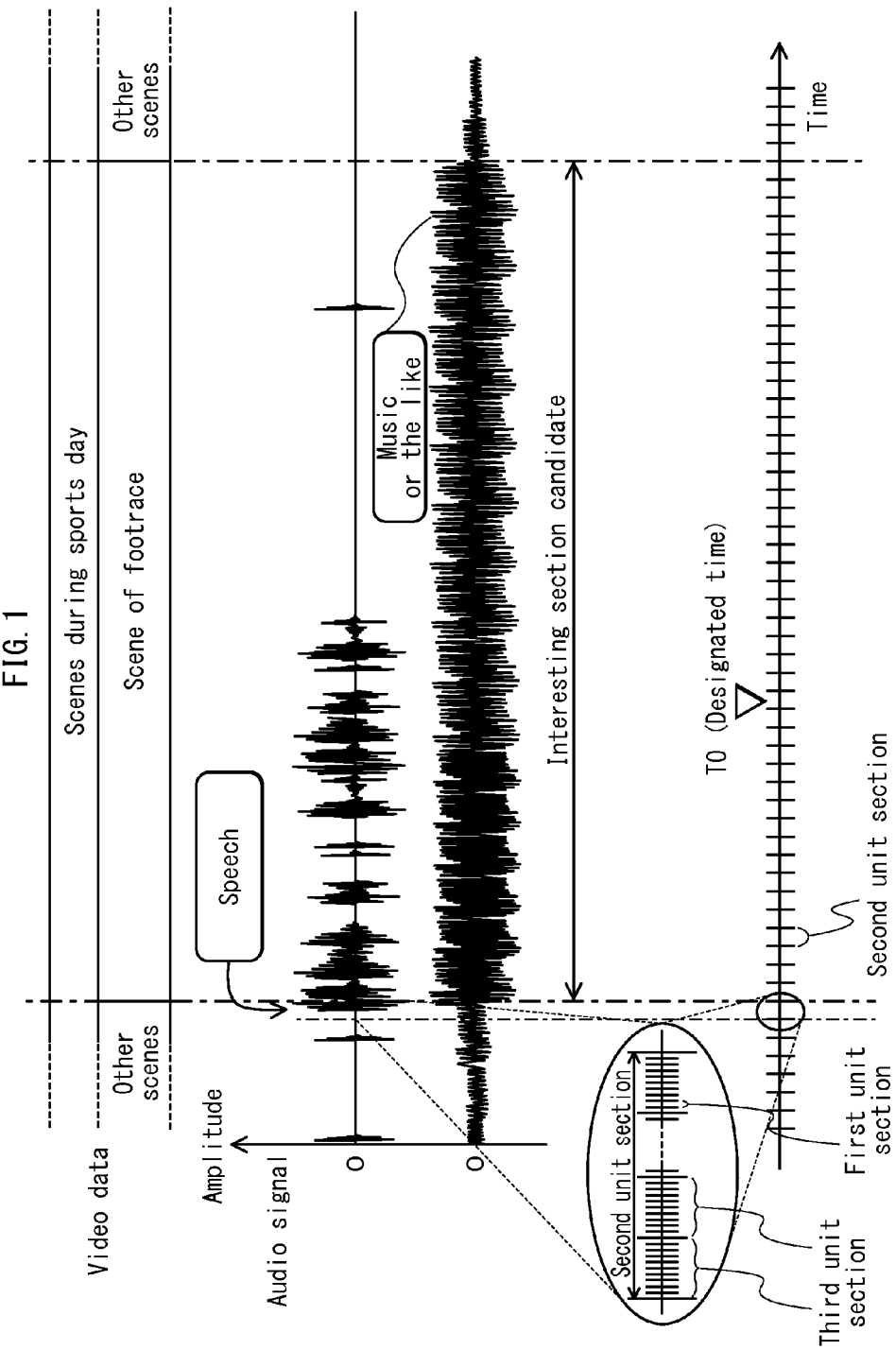

FIG. 3

| First unit section | Features | | | | |
|---|---|---|---|---|---|
| | M(1) | M(2) | M(3) | ··· | M(26) |
| 0~10ms | 0.450 | 0.505 | 0.288 | ··· | 0.373 |
| 10~20ms | 0.489 | 0.502 | 0.314 | ··· | 0.419 |
| 20~30ms | 0.530 | 0.527 | 0.287 | ··· | 0.384 |
| ⋮ | ⋮ | ⋮ | ⋮ | ⋮ | ⋮ |
| 500~510ms | 0.715 | 0.978 | 0.288 | ··· | 0.141 |
| ⋮ | ⋮ | ⋮ | ⋮ | ⋮ | ⋮ |
| 990~1000ms | – | – | – | ··· | – |

| Anchor Model | Feature appearance probability function |
|---|---|
| A1 | $b_{A1}(M)$ |
| A2 | $b_{A2}(M)$ |
| A3 | $b_{A3}(M)$ |
| ⋮ | ⋮ |
| A1024 | $b_{A1024}(M)$ |

Rth: Euclidean distance between reference vector NF0 and most distant frequency vector
NF0: center of mass vector for nine frequency vectors

REGION OF INTEREST IDENTIFICATION DEVICE, REGION OF INTEREST IDENTIFICATION METHOD, REGION OF INTEREST IDENTIFICATION PROGRAM, AND REGION OF INTEREST IDENTIFICATION INTEGRATED CIRCUIT

TECHNICAL FIELD

The present invention relates to technology for using an audio signal of an AV content to extract, from the AV content, an interesting section that is a target of user interest.

BACKGROUND ART

With regards to video recorders, such as digital cameras, there is a demand for a function to extract, from an AV content captured by a user, a section that the user finds interesting (hereinafter referred to as an "interesting section").

One conventional example is a video editing device or a video recorder that can extract an interesting section by having the user determine the start time of the interesting section by operating a controller (for example, by pressing an input button of the controller) and then determine the end time by operating the controller again. One example of video editing using a video editing device is editing by using a PC and video editing software.

With this video recorder, however, the user needs to operate the controller at the appropriate time while watching the AV content in order to extract the interesting section as desired. The user is thus required to have a certain amount of proficiency in operating the controller at the appropriate time while watching the AV content. If the user fails to determine the start and end times of the interesting section appropriately, the user needs to repeat the same controller operations again while watching the AV content. Such an approach therefore requires time and effort to extract an interesting section.

In view of the above, a video editing device has been proposed that has a function to set a start-point and an end-point by adding an offset time, set by the user in advance in accordance with the content, to a time indicated by the user (see Patent Literature 1). For example, setting this video editing device so that the time of the start-point is brought forward from the user-designated time by the offset time allows for a desired start-point to be included in the interesting section even if the user is late in indicating the in-time, thereby extracting a more appropriate interesting section.

As another example, technology for extracting an interesting section has been proposed whereby an acoustic feature condition for a start time (start-point) of the interesting section and an acoustic feature condition for an end time (end-point) of the interesting section are set in advance, and the interesting section is extracted by determining the start-point and the end-point based on these acoustic feature conditions (see Patent Literature 2).

Yet another example of proposed technology displays an acoustic waveform together with a bar indicating playback time during video playback, thereby making the acoustic waveform viewable along with the video. In this way, this technology supports the extraction of a starting point and ending point based on contour information on the amplitude of a sound (see Patent Literature 3).

Other proposals include technology for a simple method to cue sound for video in a broadcast content or a commercial by detecting the starting and ending point of a sound, in particular of speech, based on whether the contour of the amplitude power (envelope) exceeds a set threshold (see Patent Literature 4).

CITATION LIST

Patent Literature

Patent Literature 1: Japanese Patent Application Publication No. 2001-057660
Patent Literature 2: Japanese Patent Application Publication No. H3-080782
Patent Literature 3: Japanese Patent Application Publication No. 2005-260391
Patent Literature 4: Japanese Patent No. 3753384

SUMMARY OF INVENTION

Technical Problem

However, there is a desire for accurate identification of an interesting section using a method other than the methods listed in Patent Literature 1 through 4.

The present invention has been conceived in light of the above reasons, and it is an object thereof to accurately identify an interesting section.

Solution to Problem

In order to solve the above problems, an interesting section identifying device according to the present invention is for identifying an interesting section of a video file based on an audio signal included in the video file, the interesting section being a section in which a user is estimated to express interest, the interesting section identifying device comprising: an interesting section candidate extracting unit configured to extract an interesting section candidate from the video file, the interesting section candidate being a candidate for the interesting section; a detailed structure determining unit configured to determine whether the interesting section candidate includes a specific detailed structure; and an interesting section identifying unit configured to identify the interesting section by analyzing a specific section when the detailed structure determining unit determines that the interesting section candidate includes the detailed structure, the specific section including the detailed structure and being shorter than the interesting section candidate.

Advantageous Effects of Invention

With the above structure, the interesting section identifying device can accurately identify an interesting section.

BRIEF DESCRIPTION OF DRAWINGS

FIG. 1 illustrates an image device in which an interesting section extracting device is loaded.
FIG. 3 illustrates examples of feature vectors.
FIG. 4 illustrates an example of Anchor Models.

DESCRIPTION OF EMBODIMENTS

Figure 2A:
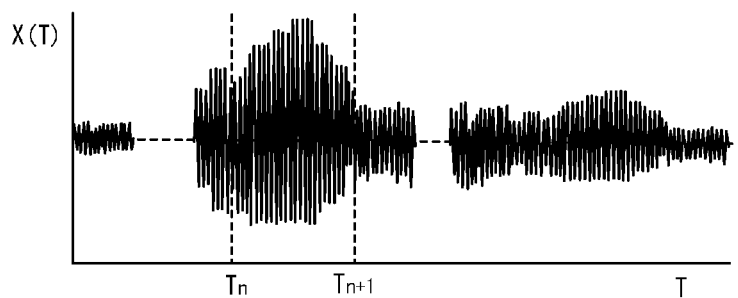
FIGS. 2A, 2B, and 2C illustrate a method of calculating a feature vector.

Process Leading Up to the Present Invention

The inventors discovered that in Patent Literature 1 through 4, the following problems appear.

With the method disclosed in Patent Literature 1, it is necessary to set an appropriate offset time. The offset time depends on the type of AV content and thus varies in length. As a result, if the user wishes to create a digest for a plurality of AV contents by extracting interesting sections from the AV contents, it becomes necessary to extract interesting sections after setting the offset time for each AV content. From the user's perspective, it is extremely annoying to decide on and set an appropriate offset time for each of the plurality of types of AV content.

With the method disclosed in Patent Literature 2, it is necessary to set the acoustic feature conditions for the start-point and the end-point in accordance with the AV content, thus making it necessary to set the acoustic feature conditions for the start-point and the end-point for each AV content in order to extract interesting sections from a plurality of AV contents. Therefore, operations to make settings for a large number of AV contents from which interesting sections are to be extracted becomes a large burden for the user.

With the method disclosed in Patent Literature 3, the user visually confirms the starting point and ending point of speech based on acoustic waveform. It is difficult, however, to determine the starting and ending points when a speech sound that has almost no power, such as a voiceless consonant, occurs at the beginning of a word, since a voiceless consonant does not easily appear in an acoustic waveform. Furthermore, in a noisy environment, the starting and ending points may be lost in the noise, making them difficult to identify.

With the method disclosed in Patent Literature 4, determination based on a threshold for amplitude power is difficult for speech that has almost no power, such as a voiceless consonant. Furthermore, when setting the threshold for amplitude power using speech as a basis, it becomes difficult to judge the movement of amplitude power of sound other than speech (such as environmental sounds).

Therefore, a variety of methods have been formulated for extracting, from a AV content, an interesting section that the user finds interesting by removing redundant sections from a home video that a user has captured.

Therefore, a variety of methods have been formulated for extracting, from a video section, an interesting section that the user finds interesting by removing redundant sections from a home video that a user has captured.

One such method is for a user to view a video and, at a point in time at which the user finds the video interesting, provide input specifying that point in time to a device. The device then acquires audio information for the input point in time and extracts a section that includes the input point in time as well as portions that extend in either direction and have sounds similar (that correlate to) to the acquired audio information.

In this case, the acquired audio information also includes characteristics of sounds in a certain section extending in either direction from the point in time at which the user found the video interesting.

The interesting section is lengthened when, in predetermined intervals extending in either direction from a certain section, audio features of the predetermined interval and the features indicated by the acquired audio information have at least a certain correlation. The same determination is made for the next predetermined interval, and the interesting section is extracted at the point at which the features are determined not to have at least a certain correlation.

This method allows for extraction of an interesting section with little input from the user.

The inventors realized, however, that with this method the interesting section is not always extracted accurately. This is because the interesting section is lengthened by predetermined intervals with this method. Accordingly, if only half of the features in a predetermined interval being examined for lengthening are similar to the features of the interesting section, the predetermined section is not included in the interesting section. In this case, for example, an interesting section may be extracted in which a conversation is cut off or starts abruptly.

In particular, when a voiceless sound occurred at the beginning or the end of a specified interesting section, a portion that should have been included in the interesting section was not included due to the difficulty in detecting audio features, even though the voiceless sound occurred.

If such an interesting section is extracted, the user viewing the interesting section may find it to be unnatural.

In order to resolve this problem, one approach is to shorten the predetermined interval used for lengthening the interesting section. The inventors realized, however, that if the predetermined interval is shortened, the audio features that can be acquired from the predetermined interval have insufficient width. This makes it difficult to lengthen the interesting section, leading to the problems of difficulty in extracting an interesting section having a certain length and the possibility of a large amount of processing in order to lengthen the interesting section.

The inventors discovered that these problems can be resolved by lengthening the interesting section using predetermined intervals of a certain length while analyzing, in particular, the beginning and the end of the interesting section so as to include such voiceless sounds in the interesting section. This approach avoids a situation in which a predetermined interval that should be included in the interesting section is not included while also preventing the interesting section from becoming too long.

With reference to the figures, the following describes an interesting section extracting device as an embodiment of an interesting section identifying device according to the present invention.

Embodiment

1. Summary

First, an overview of interesting section extraction is provided.

The interesting section extracting device of the present embodiment generates, for each first unit section (10 ms) of an audio signal included in a video file, a likelihood vector whose components are likelihoods for a feature vector that represents features of an audio signal, by using a plurality of types of Anchor Models Ar. The interesting section extracting device then calculates a frequency vector for each second unit section (1 s) that is longer than the first unit section (second unit section frequency vector) using the likelihood vectors included in the second unit section. The frequency vector is a vector representing audio features of the second unit section. The interesting section extracting device extracts an interesting section candidate by repeatedly determining whether a second unit section that includes the designated time designated by the user is similar to the second unit section on either side thereof by determining whether the respective frequency vectors are similar. In this case, the interesting section extracting device accurately extracts an interesting section by automatically identifying a detailed time structure (also referred to as a detailed structure) included in the interesting section candidate and only analyzing necessary portions (mainly near the starting point and the ending point of the interesting section candidate).

In this context, a detailed time structure is a structure in which sounds with different properties are included in the same predetermined interval. In other words, this is a structure in which each second unit section includes at least two likelihood vectors that are separated from each other by at least a predetermined distance. The inclusion of sounds with different properties is due to the increase in the probability of a sound change in the predetermined interval.

For example, assume that the video file contains captured scenes of a Sports Day, as illustrated in FIG. 1. Assume also that a user wishes to edit the video file to extract a scene that extends for a predetermined period from approximately the start of a footrace.

In this case, when the user indicates a time near the start time of the footrace included in the footrace scene, the interesting section extracting device extracts a partial section that includes the designated time as an interesting section candidate.

When the starting point portion of the section to be extracted as an interesting section includes a detailed time structure for the starting time of speech or the like (speech near the starting point in FIG. 1), the interesting section extracting device according to the present embodiment analyzes the substructure of only the necessary portion, accurately extracting a feature section (see the starting point portion of speech in the expanded portion of speech near the starting point in FIG. 1). Note that in the present embodiment, the interesting section is extracted in standard units of the second unit sections (1 s), the length of the second unit section being 100 times that of the first unit section. When the interesting section is extracted by second unit sections and it is determined that the standard unit of time includes a detailed structure, the interesting section extracting device analyzes the substructure only in that portion, the substructure being analyzed in units of third unit sections (100 ms) that are 10 times as long as the first unit section. In other words, after extracting a rough candidate interesting section in units of second unit sections, the interesting section extracting device determines the interesting section accurately using smaller third unit sections.

In the present description, the term "audio" is used to indicate sound in general, whereas the term "speech" is used to indicate human voice.

2. Data

The following explains the types of data used by the interesting section extracting device of the present embodiment.

2-1. Video File

The video file includes a plurality of pieces of image data that are continuous along the time axis and an audio signal. In this context, an audio signal is time series data consisting of acoustic amplitude values recorded as a digital signal (or an analog signal that has been converted into a digital signal). The audio signal may be represented as a waveform, for example as shown in FIG. 2A, by listing these amplitude values along the time axis.

2-2. Feature Vector

A feature vector is an audio signal of a unit time that has been converted into a Mel-Frequency Cepstrum Coefficients vector.

In greater detail, an audio signal is represented as a waveform as shown in FIG. 2A. In the present embodiment, a feature vector is calculated for each first unit section within an audio signal. Here, the first unit section is a section from time Tn to time Tn+1 in FIG. 2A. A specific example is 10 ms.

Figure 2B:
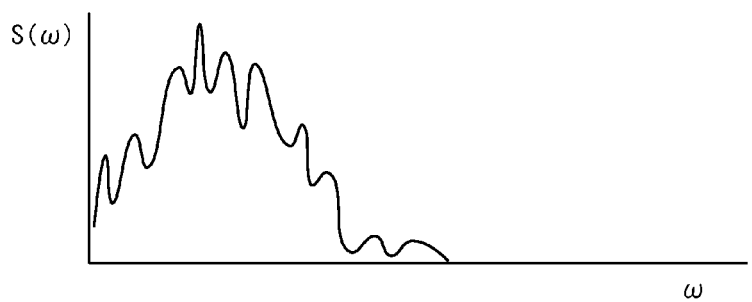

When calculating the feature vector, the audio signal in the first unit section is converted into a power spectrum $S(\omega)$ (see FIG. 2B). The power spectrum is a conversion into frequency components of the amplitude values (power) of a predetermined unit section (here, the first unit section). The horizontal axis of the power spectrum $S(\omega)$ shown in FIG. 2B represents the real frequency.

Figure 2C:
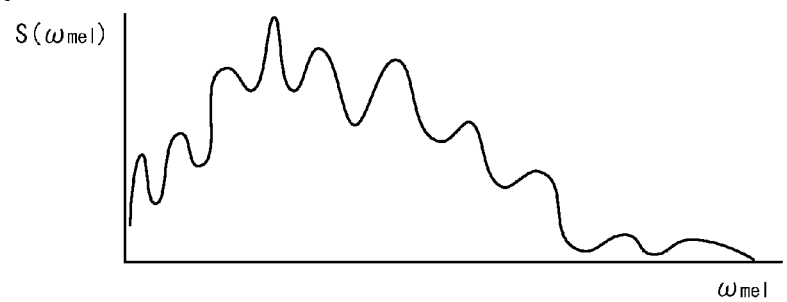

The horizontal axis of the power spectrum $S(\omega)$ is then converted from the real frequency $\omega$ to a Mel frequency (see FIG. 2C).

A feature vector consisting of 26 Mel-Frequency Cepstrum Coefficients (MFCC) is calculated from the power spectrum in which the horizontal axis has been converted to the Mel frequency.

The resulting feature vector M is calculated for each first unit section (every 10 ms), and therefore, as shown in FIG. 3, in the interval from 0 seconds to 1 second, a total of 100 feature vectors are calculated. Note that in FIG. 3, $M(1)$ through $M(26)$ indicate the 26-dimensional Mel-Frequency Cepstrum Coefficients.

2-3. Anchor Models

Anchor Models in the present embodiment represent the characteristics of 1024 sound types that serve as a reference when calculating likelihood. The Anchor Models are created for each sound piece, and each Anchor Model is composed of a plurality of parameters.

The present embodiment adopts a Gaussian Mixture Model (GMM) to create Anchor Models Ar (r=1 through 1024).

Anchor Models are now described with reference to FIG. 4. As illustrated in FIG. 4, Anchor Models are represented by feature appearance probability functions $b_{Ar}(M)$ that correspond to the 1024 sound types. The feature appearance probability functions $b_{Ar}(M)$ are probability functions indicating the probability that each Anchor Model Ar exists. Using the feature appearance probability functions $b_{Ar}(M)$, likelihood is calculated with the 26-dimensional MFCC vector (feature vector) M as an argument. Note that FIG. 4 does not show which Anchor Model corresponds to which sound piece.

2-4. Likelihood Vector

Likelihood vectors F have likelihoods Lr as their components. The likelihoods Lr are calculated for the feature vectors M that represent the features of the audio signal, using the Anchor Models Ar (r=1 to 1024) that correspond to the plurality of sound types. Accordingly, the likelihood vector F is represented as a 1024-dimensional vector. The feature vectors M are generated for each first unit section of the audio signal extracted by an audio extracting device 102, as described above in Section 2-2.

Figure 5:
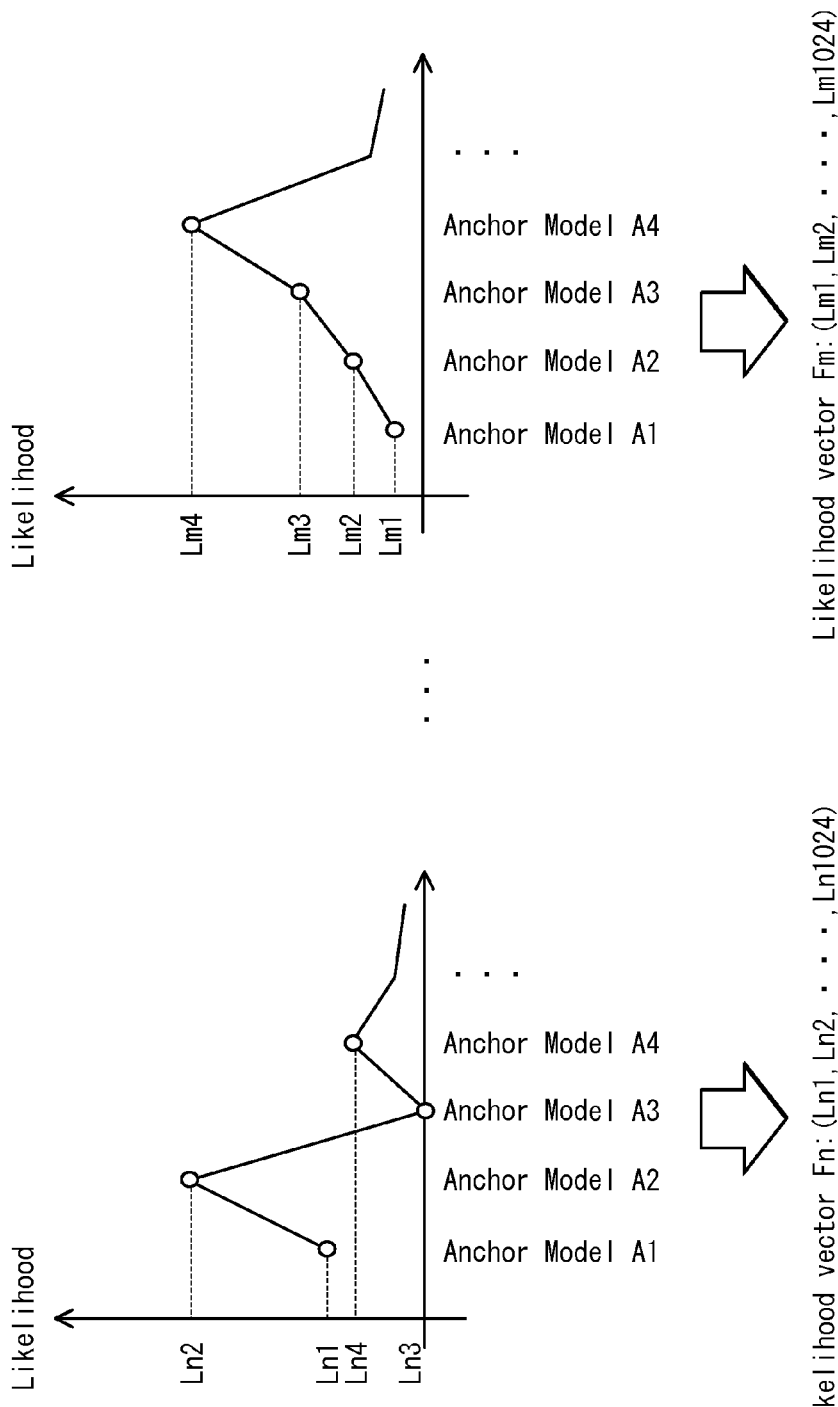
FIG. 5 illustrates an example of likelihood vectors.

FIG. 5 shows examples of likelihood vectors. FIG. 5 illustrates likelihood vectors Fm and Fn calculated using Anchor Models Ar that correspond to the 1024 sound types. The right side of FIG. 5 is a likelihood vector Fm, whereas the left side is a likelihood vector Fn. In FIG. 5, the vertical axis indicates the likelihood of the audio signal for the Anchor Model, and the horizontal axis indicates the type of the Anchor Model Ar. The likelihood vector Fn is the likelihood vector corresponding to the $n^{th}$ first unit section from time 0 (reference time), i.e. the section from time (10×(n−1)) ms to time (10×n) ms (for example, see FIG. 2A). Similarly, the likelihood vector Fm is the likelihood vector corresponding to the $m^{th}$ first unit section from time 0 (reference time), i.e. the section from time (10×(m−1)) ms to time (10×m) ms.

As illustrated by the likelihood vectors Fm and Fn in FIG. 5, the likelihood vector F changes over time for the target audio signal. Note that when there is no change in the audio signal, the likelihood vector does not change over time.

3. Structure

The following describes the functional structure of the video editing device 100 into which is mounted an interesting section extracting device 104 according to the present embodiment.

3-1. Overall Structure

Figure 6:
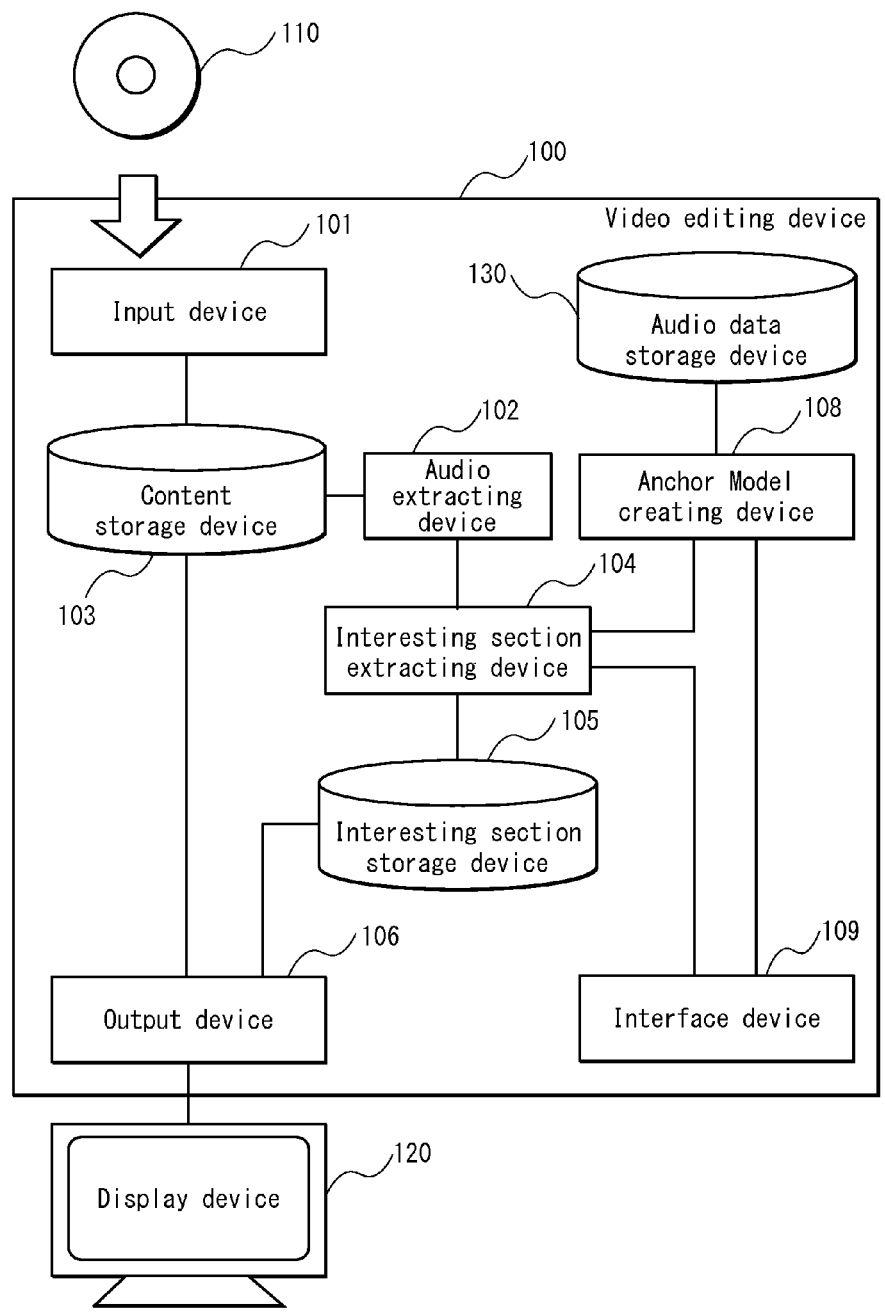
FIG. 6 is a block diagram illustrating an example of the functional structure of an image device in which an interesting section extracting device is loaded.

FIG. 6 is a block diagram showing an example of functional structure of the video editing device 100. As shown in FIG. 6, the video editing device 100 includes an input device 101, an audio extracting device 102, a content storage device 103, an interesting section extracting device 104, an interesting section storage device 105, an output device 106, an Anchor Model creating device 108, an interface device 109, and an audio data storage device 130.

The input device 101 is composed of a disk drive device or the like, and has a function such that when a recording medium 110 is loaded therein, the input device 101 reads a video file from the recording medium 110 and stores the video file in the content storage device 103. Note that the recording medium 110 is a medium, such as an optical disc, a flexible disk, an SD card, or a flash memory, with a function to store a variety of data.

The audio extracting device 102 has a function to acquire a video file stored in the content storage device 103, extract the audio signal from the acquired video file, and input the audio signal into the interesting section extracting device 104. Note that the audio extracting device 102 generates an audio signal as illustrated in FIG. 2A by performing a decoding process on an encoded audio signal.

The content storage device 103 is composed of a hard disk device or the like and has a function to store the video file that has been obtained from the input device 110.

The interesting section extracting device 104 has a function to extract an interesting section from the video file stored in the content storage device 103 based on the designated time acquired from the interface device 109 and the audio signal input by the audio extracting device 102 and store interesting section data indicating the extracted interesting section in the interesting section storage device 105. Details on the interesting section extracting device 104 are provided below.

The interesting section storage device 105 is composed of a hard disk device or the like and has a function to store the interesting section data acquired from the interesting section extracting device 104. The interesting section data is composed of information identifying the video file stored in the content storage device 103 (video file ID) and information indicating the time along the playback time axis (time slot) of the video file.

The audio data storage device 130 is composed of a hard disk device or the like and has a function to store audio data that is used by the Anchor Model creating device 108 when it creates the Anchor Models Ar that represent features of a plurality of sound types. The audio data is composed of audio signals obtained by extracting audio signals from a plurality of video files other than the video file from which the interesting section is to be extracted and decoding the extracted audio signals. Note that the audio data may include the audio signal for the video file from which the interesting section is to be extracted.

The output device 106 has a function to output video data to a display device 120 to cause the display device 120 to display images. The output device 106 also has a function to acquire interesting section data from the interesting section storage device 105, extract a plurality of pieces of image data composing a portion of the video content from the content storage device 103 based on the acquired interesting section data, and cause the display device 120 to display a digest video yielded by connecting the extracted plurality of pieces of image data. The display device 120 is a display that has a function to display video. The display device 120 may be a display pertaining to the video editing device 100 or an external display.

The Anchor Model creating device 108 has a function to create Anchor Models Ar from the audio data stored in the audio data storage device 130. The Anchor Model creating device 108 also has a function to output the created Anchor Models Ar to the interesting section extracting device 104. Details on the Anchor Model creating device 108 are provided below.

The interface device 109 is provided with an operation unit (not shown in the figures), such as a keyboard, accepts input operations from the user, and has a function to transmit the input information to each component of the video editing device 100. In the present embodiment, the interface device 109 notifies the interesting section extracting device 104 of information on the designated time received from the user and information related to the length of the interesting section, and also notifies the Anchor Model creating device 108 of the number of Anchor Models to be created.

3-2. Interesting Section Extracting Device 104

Details on the interesting section extracting device 104 are now provided. The interesting section extracting device 104 is composed of a processor (not shown in the figures) and memory (not shown in the figures) and implements the structure shown in FIG. 7 by the processor executing programs read into the memory.

Figure 7:
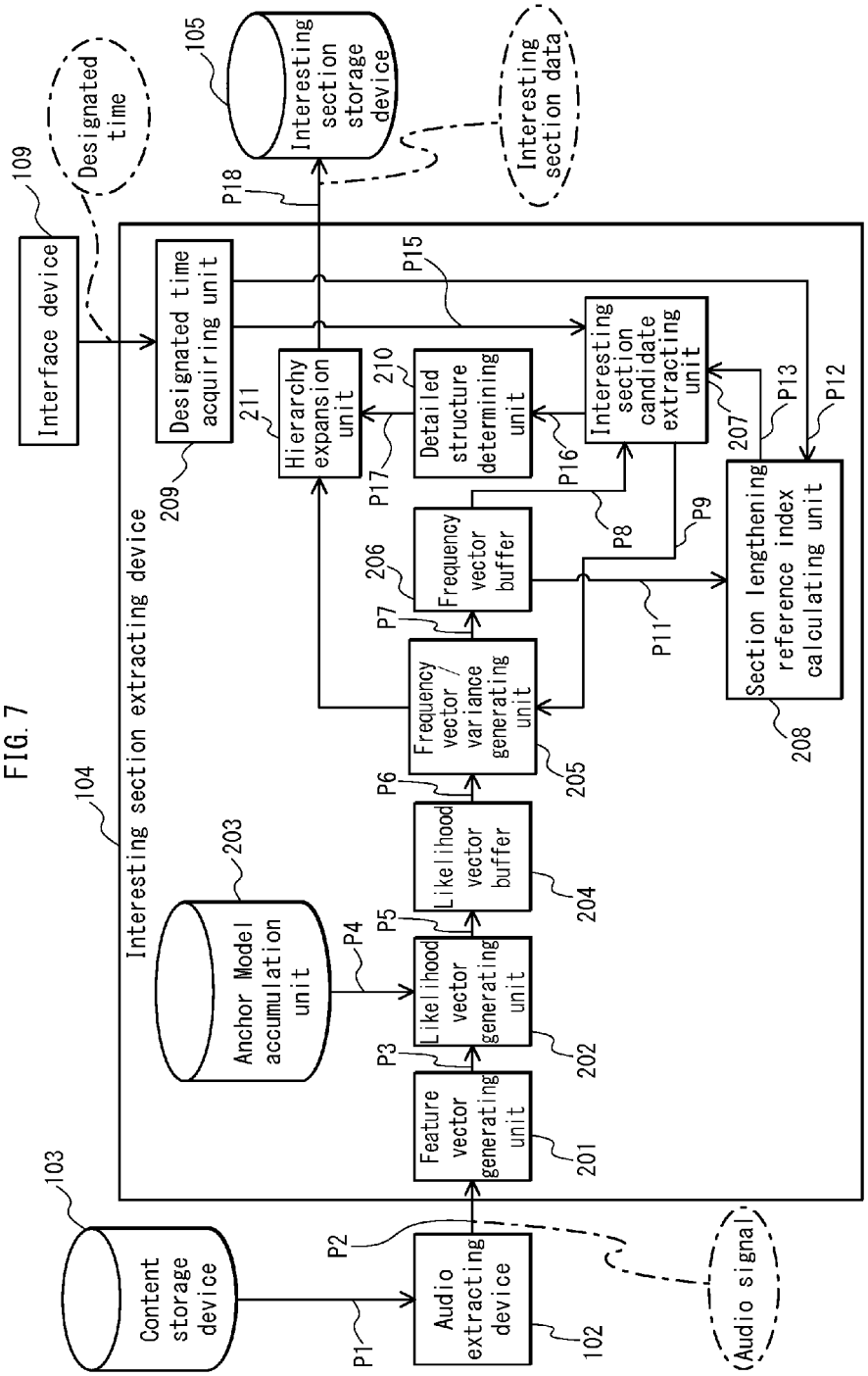
FIG. 7 is a block diagram illustrating an example of the functional structure of the interesting section extracting device.

FIG. 7 is a block diagram showing an example of the functional structure of the interesting section extracting device 104. As illustrated in FIG. 7, the interesting section extracting device 104 is provided with a feature vector generating unit 201, a likelihood vector generating unit 202, an Anchor Model accumulation unit 203, a likelihood vector buffer 204, a frequency vector/variance generating unit 205, a frequency vector buffer 206, an interesting section candidate extracting unit 207, a section lengthening reference index calculating unit 208, a designated time acquiring unit 209, a detailed structure determining unit 210, and a hierarchy expansion unit 211. Each component is described below.

3-2-1. Feature Vector Generating Unit 201

The feature vector generating unit 201 has a function to generate feature vectors from an input audio signal. As described in section 2-2, the feature vector generating unit 201 performs audio analysis by first unit section on audio signal input from the audio extracting device 102 to calculate the power spectrum S(ω). The feature vector generating unit 201 then generates a feature vector M (M(1), M(2), ..., M(25), M(26)) from the calculated power spectrum S(ω). As illustrated in FIG. 3, the feature vector generating unit 201 generates 100 feature vectors for one second.

3-2-2. Anchor Model Accumulation Unit 203

The Anchor Model accumulation unit 203 is implemented by a hard disk device or the like and has a function to store the Anchor Models Ar created by the Anchor Model creating device 108. The Anchor Models Ar are assumed to be stored in the Anchor Model accumulation unit 203 before execution of interesting section extraction processing.

3-2-3. Likelihood Vector Generating Unit 202

The likelihood vector generating unit 202 has a function to calculate a likelihood Lr of the feature vector M for the Anchor Model Ar of each sound piece accumulated in the Anchor Model accumulation unit 203 and generate a likelihood vector F whose components are the calculated likelihoods Lr. The likelihood vector generating unit 202 also has a function to store the generated likelihood vector F in the likelihood vector buffer 204.

3-2-4. Likelihood Vector Buffer 204

The likelihood vector buffer 204 is composed of a partial region of the memory and has a function to store the likelihood vector F generated by the likelihood vector generating unit 202.

3-2-5. Frequency Vector/Variance Generating Unit 205

Figure 8:
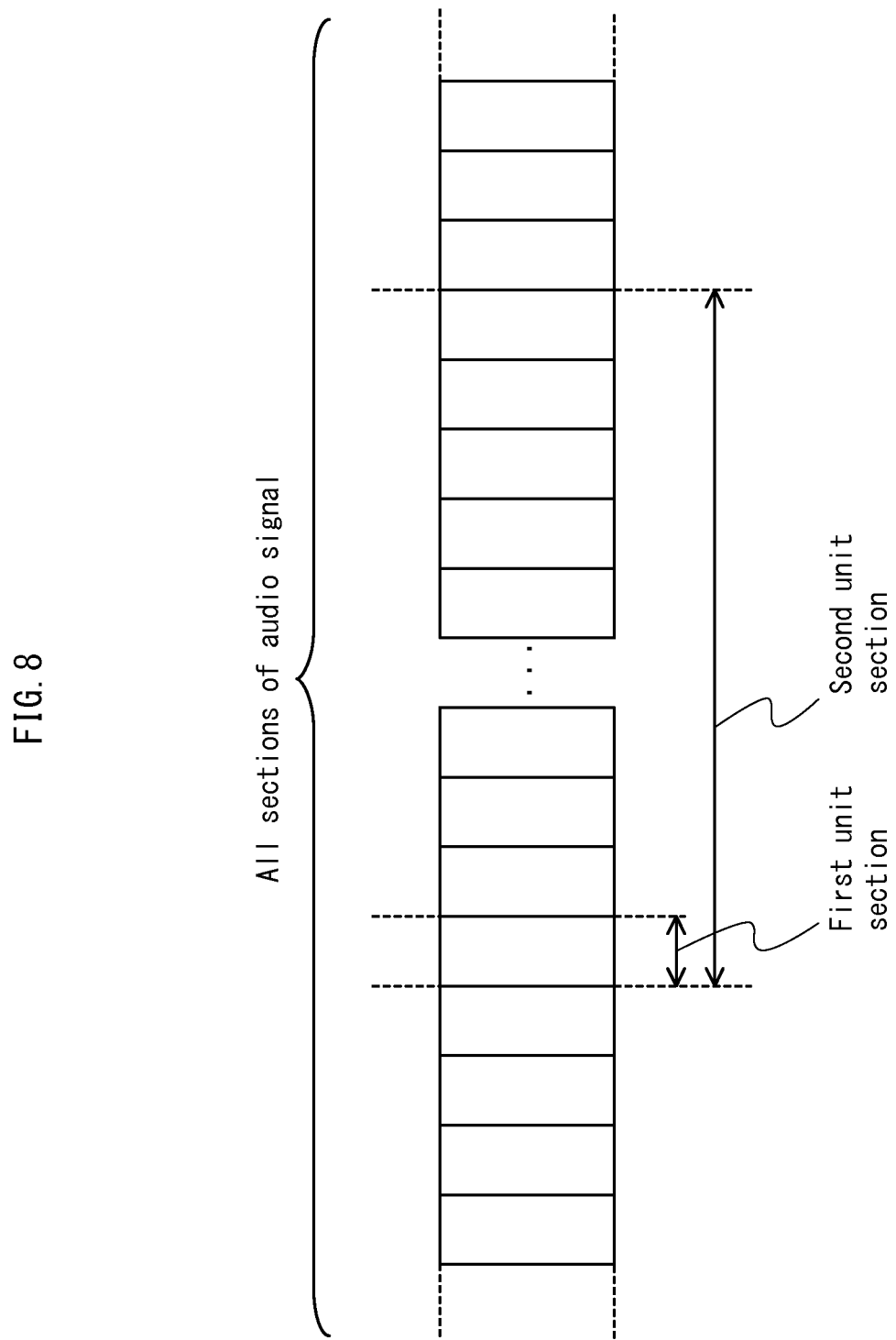
FIG. 8 illustrates the relationship between a first unit section and second unit sections.
Figure 9:
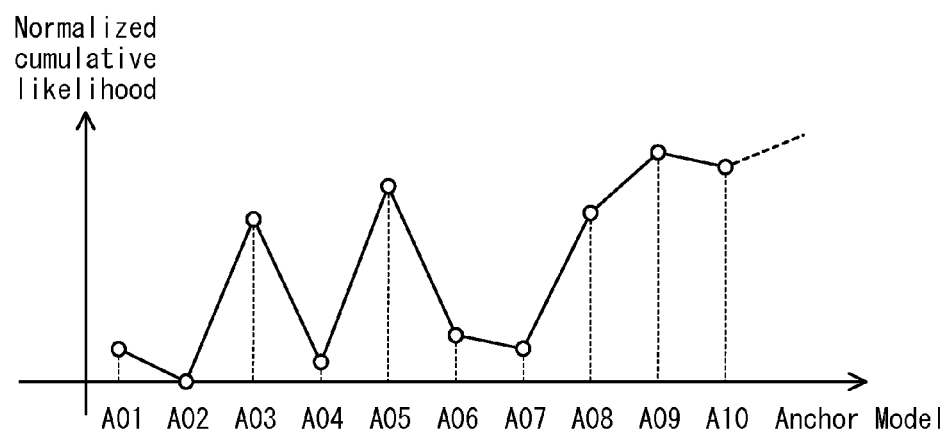
FIG. 9 illustrates an example of a frequency vector.

The frequency vector/variance generating unit 205 has a function to generate a frequency vector NF for each second unit section (each second) of the audio signal. As illustrated in FIG. 8, the second unit section corresponds to a plurality of continuous first unit sections (in the present embodiment, 100 first unit sections, as described above). The frequency vector NF corresponds to the normalized cumulative likelihood of the likelihood vector included in the second unit section. Specifically, the frequency vector/variance generating unit 205 accumulates (adds up) the value of each component in all of the likelihood vectors included in the second unit section. The frequency vector/variance generating unit 205 then normalizes the accumulated components to calculate the frequency vector. Here, normalization refers to setting the norm of the frequency vector to 1. FIG. 9 is a schematic diagram showing an example of the frequency vector NF.

In accordance with instructions from the interesting section candidate extracting unit 207, the frequency vector/variance generating unit 205 starts and stops generation of the frequency vector NF.

Furthermore, the frequency vector/variance generating unit 205 calculates third unit section frequency vectors, calculated in units of third unit sections (100 ms) using similar procedures as for the second unit section, and uses the 10 calculated third unit section frequency vectors to calculate a variance for each second unit section.

Note that the variance σ is calculated using Equation 1 below.

$$\sigma^2 = \frac{1}{n}\sum_{1}^{n}(X_i - C)^2 \qquad \text{Equation 1}$$

In the above equation, n is the number of third unit section frequency vectors. Here, n is 10. $X_i$ represents each third unit section frequency vector. C is the center of mass vector of the third unit section frequency vectors and is calculated with Equation 2 below.

$$C = \frac{1}{n}\sum_{1}^{n}X_i \qquad \text{Equation 2}$$

3-2-6. Frequency Vector Buffer 206

The frequency vector buffer 206 has a function to store the frequency vectors generated by the frequency vector/variance generating unit 205 in association with information indicating the second unit section targeted for calculation.

3-2-7. Designated Time Acquiring Unit 209

The designated time acquiring unit 209 has a function to acquire designated time information regarding the designated time from the interface device 109 and transmit the designated time information to the section lengthening reference index calculating unit 208 and the interesting section candidate extracting unit 207.

3-2-8. Section Lengthening Reference Index Calculating Unit 208

The section lengthening reference index calculating unit 208 has a function to receive the designated time information from the designated time acquiring unit 210 and calculates a reference vector NF0, a threshold Rth, and a maximum variance value σmax which serve as reference indices for determining whether or not to include, in the interesting section candidate, a second unit section that is earlier or later along the time axis of the second unit section that includes the designated time. The section lengthening reference index calculating unit 208 also has a function to transmit the calculated reference vector NF0, threshold Rth, and maximum variance value σmax to the interesting section extracting unit 207.

Figure 10:
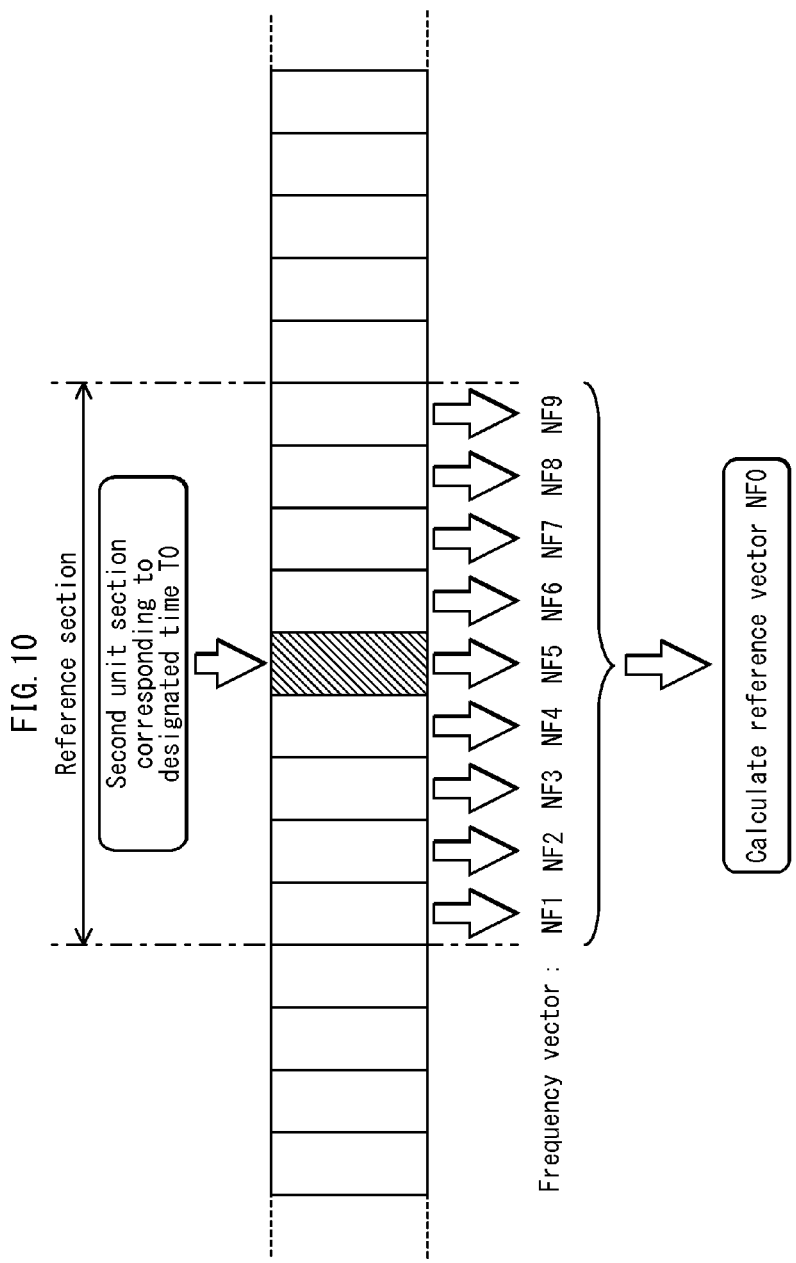
FIG. 10 illustrates operations when generating a reference vector.

Specifically, the section lengthening reference index calculating unit 208 acquires, from the frequency vector buffer 206, the frequency vector NF for the second unit section that includes the designated time. The section lengthening reference index calculating unit 208 also acquires, from the frequency vector buffer 206, the frequency vector NF for a plurality of second unit sections that are continuous with the second unit section that includes the designated time. In the example in FIG. 10, four second unit sections on either side of the second unit section that includes the designated time comprise the plurality of second unit sections that are continuous with the second unit section that includes the designated time. The section lengthening reference index calculating unit 208 calculates the reference vector NF0 by taking the average of the nine acquired frequency vectors (NF1 through NF9). In other words, for each Anchor Model the section lengthening reference index calculating unit 208 calculates the total of the normalized cumulative likelihoods constituting the frequency vectors and divides the total values by the number of frequency vectors used (9), and generates the reference vector NF by setting the components thereof to the values resulting from division.

Furthermore, the section lengthening reference index calculating unit 208 calculates the Euclidean distance between the reference vector NF0 and the plurality of frequency vectors NF1 through NF9 used to generate the reference vector NF0 and calculates the threshold Rth used to decide on inclusion in the interesting section candidate. The threshold Rth is the Euclidean distance between the reference vector NF0 and the one of the frequency vectors NF with the greatest Euclidean distance from the reference vector NF0.

Furthermore, the section lengthening reference index calculating unit 208 determines that the maximum variance value σmax is the maximum value among the variances corresponding to the second unit sections within the reference section as calculated by the frequency vector/variance generating unit 205.

Figure 11:
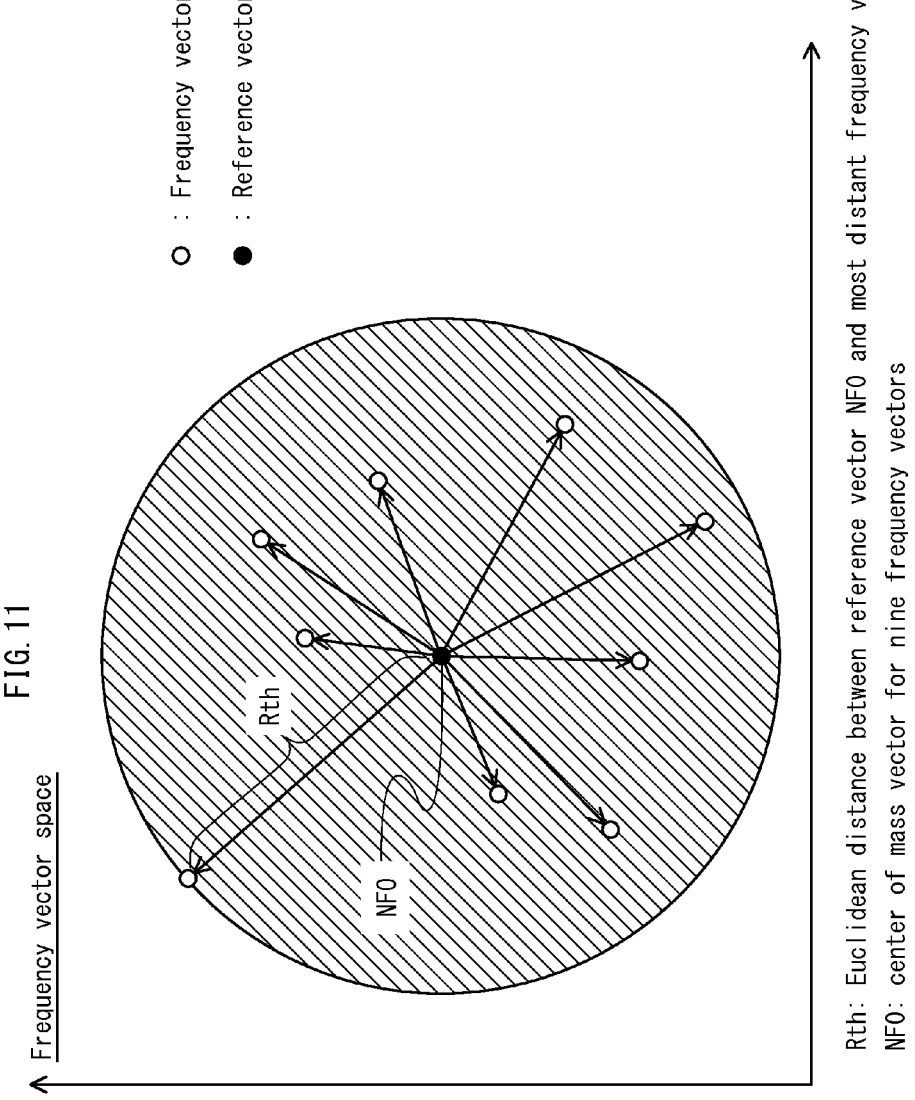
FIG. 11 illustrates operations when calculating a threshold.

FIG. 11 is a conceptual diagram illustrating the reference vector NF0, each of the frequency vectors NF, and the threshold Rth using the concept of the frequency vector space. In FIG. 11, each small circle indicates a frequency vector NF used to calculate the reference vector NF0 (corresponding to the frequency vectors NF1 through NF9 in the reference section shown in FIG. 10). The center of the circular hatched section is the reference vector NF0. If the frequency vector of another second unit section fits into this hatched section, that second unit section is included in the interesting section candidate.

Subsequently, the section lengthening reference index calculating unit 208 transmits the generated reference vector NF0, threshold Rth, and maximum variance value σmax to the interesting section candidate extracting unit 207.

3-2-9. Interesting Section Candidate Extracting Unit 207

The interesting section candidate extracting unit 207 has a function to extract an interesting section candidate, which is a candidate to become the interesting section, based on the frequency buffer stored in the frequency vector buffer 206, the designated time received from the designated time acquiring unit 209, and the reference vector NF0 and threshold Rth received from the section lengthening reference index calculating unit 208.

Figure 12A:
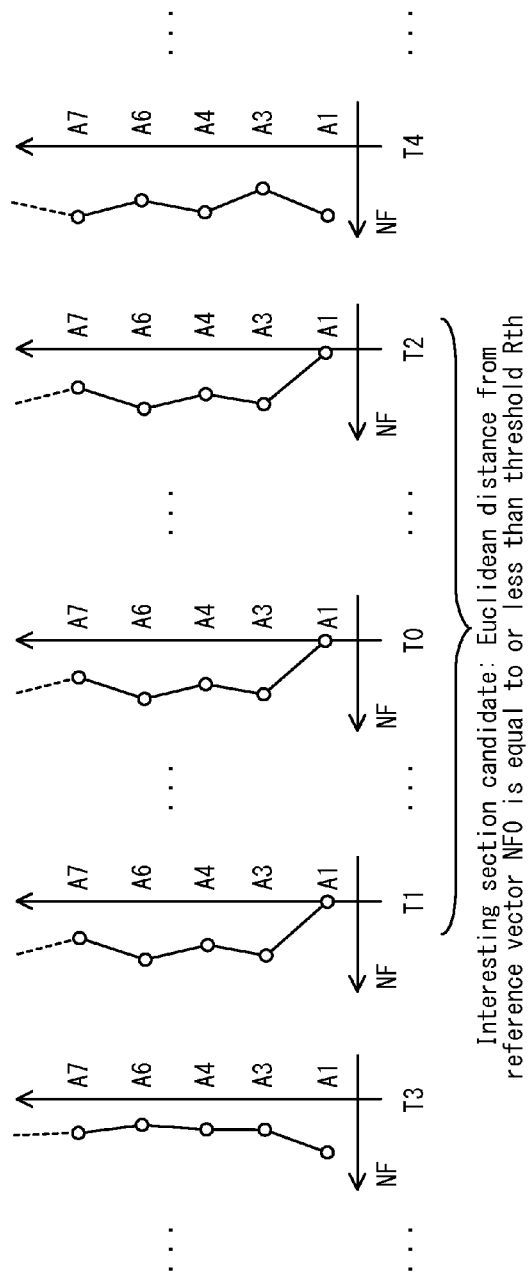
FIGS. 12A and 12B illustrate the reference vector.

In the example in FIG. 12A, the interesting section candidate is located between two times, T1 and T2. The times T1 and T2 respectively occur immediately before (i.e. closer to the reference section) times T3 and T4 for which the Euclidean distance between the frequency vector NF and the reference vector NF0 exceeds the threshold Rth input from the section lengthening reference index calculating unit 208. In the example in FIG. 12A, the frequency vector at time T3 and the frequency vector at time T1, as well as the frequency vector at time T4 and the frequency vector at time T2, clearly differ. Therefore, in this example, the Euclidean distance between the frequency vectors at times T3 and T4 and the reference vector exceeds the threshold Rth.

Figure 12B:
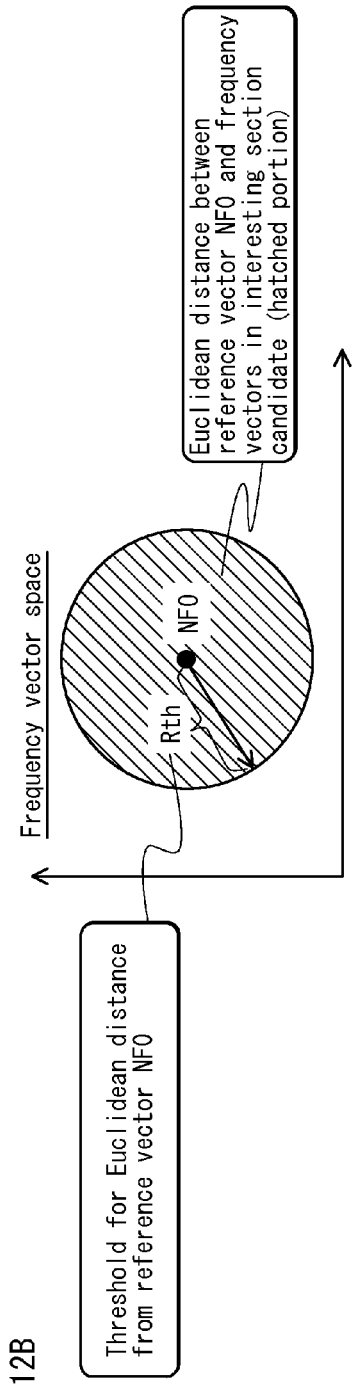

FIG. 12B shows the relationship between the threshold Rth in the frequency vector space and the Euclidean distance. In the frequency vector space shown in FIG. 12B, the frequency vector NF of the interesting section candidate is located on the inside of a circle having a radius Rth and centered on the reference vector NF0.

Figure 13:
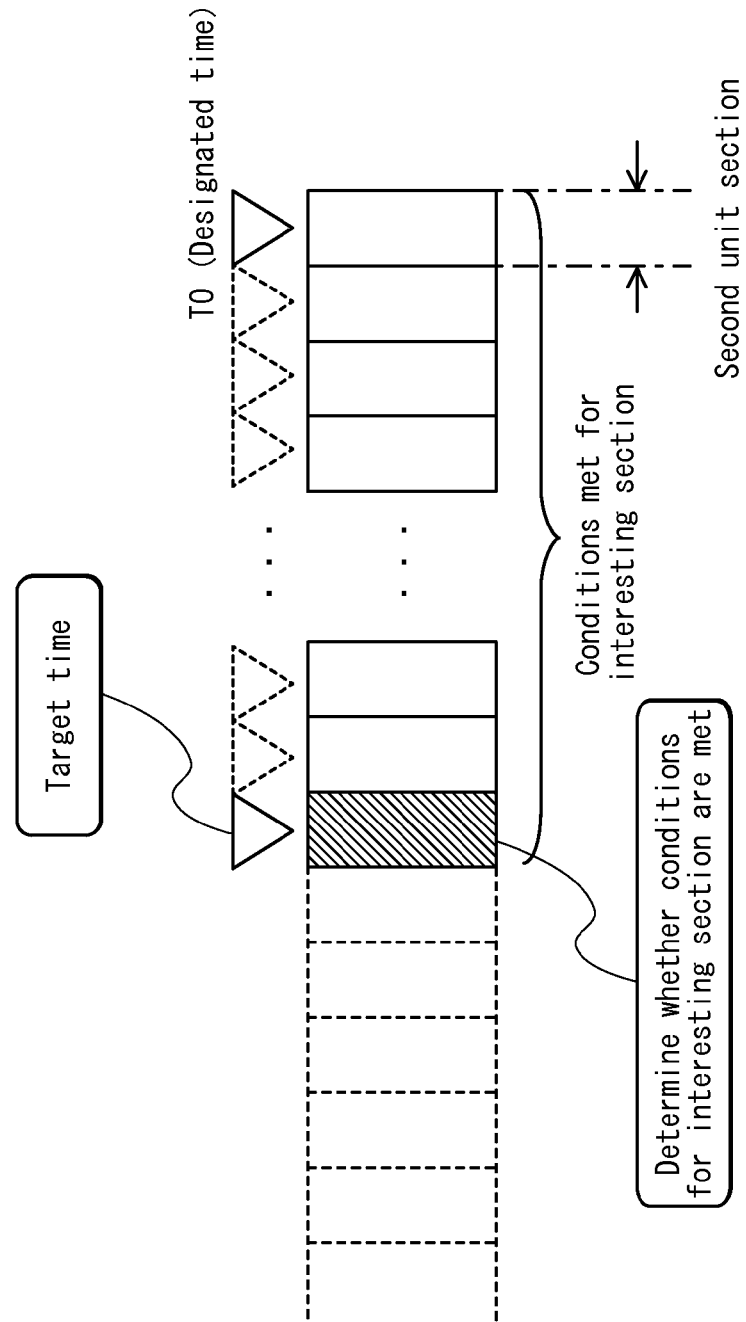
FIG. 13 illustrates operations when extracting an interesting section.

As illustrated in FIG. 13, the interesting section candidate extracting unit 207 works backwards in time from the designated time T0, calculating the Euclidean distance between the reference vector NF0 and the frequency vector NF at a target time and determining whether the calculated Euclidian distance exceeds the threshold Rth (i.e. whether the second unit section including the target time should no longer be included in the interesting section candidate). Similarly, while not shown in FIG. 13, the interesting section candidate extracting unit 207 performs the same processing in the forward direction of the time axis, determining whether the second unit section including the target time should be included in the interesting section candidate.

When the calculated Euclidian distance exceeds the threshold (Rth), the interesting section candidate extracting unit 207 notifies the frequency vector/variance generating unit 205 of a frequency vector creation completion instruction.

Specifically, the interesting section candidate extracting unit 207 acquires the frequency vector of the second unit section that occurs along the time axis immediately before the current interesting section candidate (referred to as the temporary interesting section candidate) and determines whether the Euclidean distance between the acquired frequency vector NF and the reference vector NF0 exceeds the threshold Rth. When the Euclidean distance is equal to or less than the threshold Rth, the interesting section candidate extracting unit 207 includes the second unit section in the temporary interesting section candidate, and then repeats the determination of whether a second unit section that is immediately before the new temporary interesting section candidate should be included in the new temporary interesting section candidate. When the Euclidean distance exceeds the threshold Rth, the interesting section candidate extracting unit 207 sets the starting point of the current temporary interesting section candidate as the starting point of the interesting section candidate. Note that at the start, the reference section is the temporary interesting section candidate.

Similarly, the interesting section candidate extracting unit 207 acquires the frequency vector of the second unit section that is one second unit section later along the time axis of the temporary interesting section candidate and determines whether the Euclidean distance between the acquired frequency vector NF and the reference vector NF0 exceeds the threshold Rth. When the Euclidean distance is equal to or less than the threshold Rth, the interesting section candidate extracting unit 207 includes the second unit section in the temporary interesting section candidate, and then repeats the determination of whether a second unit section that is one later than the new temporary interesting section candidate should be included in the temporary interesting section candidate. When the Euclidean distance exceeds the threshold Rth, the interesting section candidate extracting unit 207 sets the ending point of the current temporary interesting section candidate as the ending point of the interesting section candidate.

The interesting section candidate extracting unit 207 then transmits the interesting section candidate thus extracted to the detailed structure determining unit 210.

Note that when extending the temporary interesting section candidate, the interesting section candidate extracting unit 207 both determines whether the second unit section that is the target of determination should be included in the temporary interesting section candidate and, at the same time, determines whether the length between the target time and the designated time T0 is shorter than a preset interesting section length le. Upon determining that the Euclidean distance does not exceed the threshold Rth (i.e. inclusion in the interesting section candidate) and that the length between the target time and the designated time T0 is shorter than the preset interesting section length le (i.e. upon determining that the conditions for the interesting section are met), the interesting section candidate extracting unit 207 sets the group of second unit sections that include the target time as the interesting section candidate. Note that when the length is longer than the length le of the interesting section, the interesting section candidate extracting unit 207 sets the temporary interesting section candidate at that point in time as the interesting section candidate.

3-2-10. Detailed Structure Determining Unit 210

The detailed structure determining unit 210 has a function to determine whether the initial second unit section (hereinafter referred to as starting point candidate Stc) and the last second unit section (hereinafter referred to as ending point candidate Etc) in the interesting section candidate acquired by the interesting section candidate extracting unit 207 contain a detailed structure. When determining that the starting point candidate does not contain a detailed structure, the detailed structure determining unit 210 also has a function to determine whether the second unit section that is immediately before the interesting section candidate contains a detailed structure, and when determining that the ending point candidate does not contain a detailed structure, the detailed structure determining unit 210 also has a function to determine whether the second unit section that is immediately after the interesting section candidate contains a detailed structure. The detailed structure determining unit 210 has a function to transmit the results of the determination regarding a detailed structure (including information on which second unit section contains the detailed structure when such a detailed structure exists) to the hierarchy expansion unit 211.

Specifically, the detailed structure determining unit 210 compares the variances $\sigma stc$ and $\sigma etc$ for the starting point candidate Stc and the ending point candidate Etc transmitted by the interesting section candidate extracting unit 207 with the maximum variance value $\sigma max$. When $\sigma stc > \sigma max$, the detailed structure determining unit 210 determines that the starting point candidate Stc contains a detailed structure. When $\sigma etc > \sigma max$, the detailed structure determining unit 210 determines that the ending point candidate Etc contains a detailed structure.

Furthermore, if $\sigma stc \leq \sigma max$, the detailed structure determining unit 210 determines whether the second unit section immediately before the interesting section candidate includes a detailed structure. Similarly, if $\sigma etc \leq \sigma max$, the detailed structure determining unit 210 determines whether the second unit section immediately after the interesting section candidate includes a detailed structure.

Figure 15:
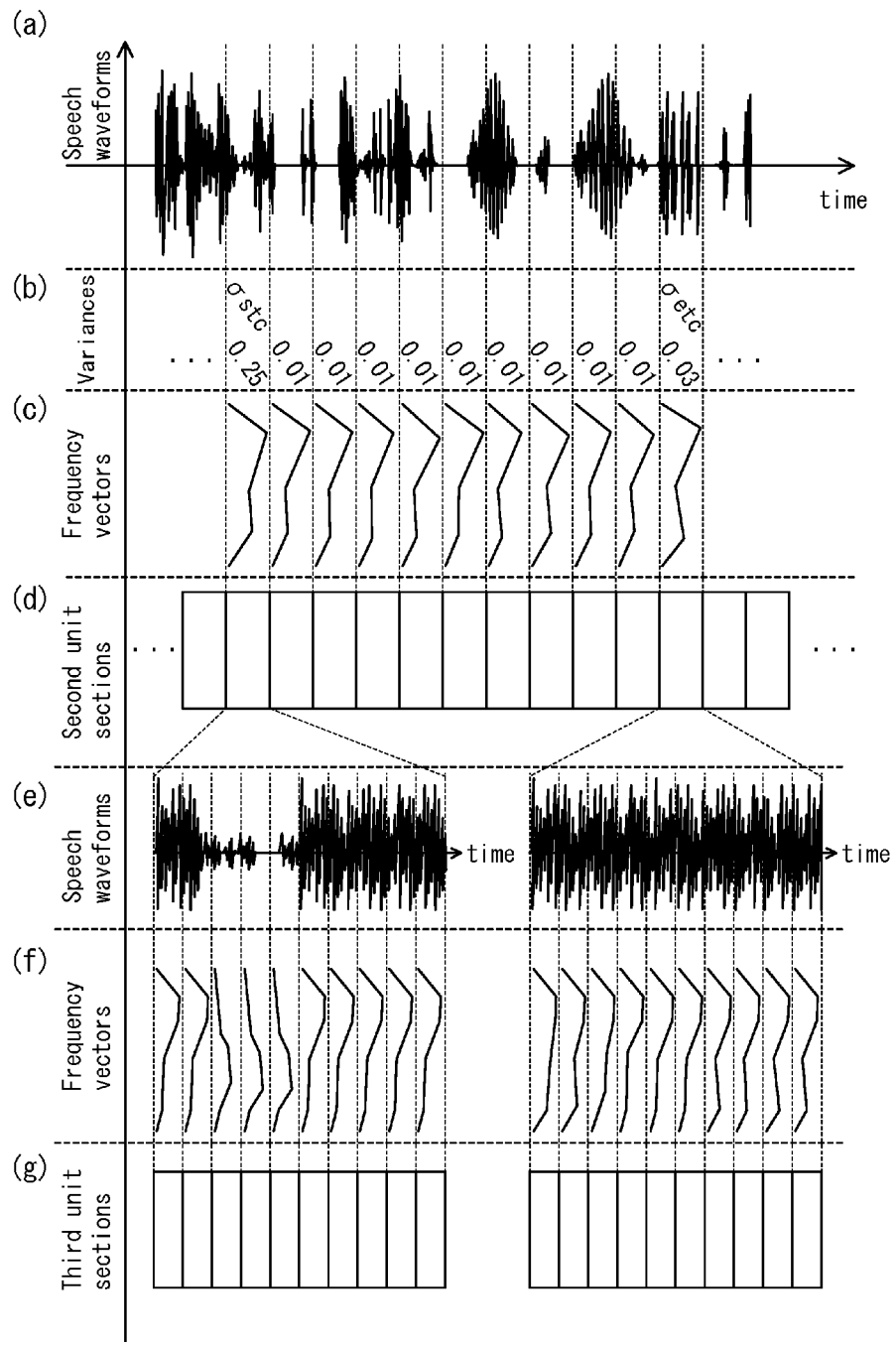
FIG. 15 is a conceptual diagram illustrating detailed structure determination and hierarchy expansion.

FIG. 15 is a conceptual diagram of the detailed structure determination. With reference to FIG. 15, an example of the detailed structure determination is now provided. In order from the top tier, FIG. 15 illustrates the following: (a) an example of an acoustic waveform included in an audio signal, (b) an example of variances of second unit sections, (c) an example of frequency vectors of the second unit sections, (d) the second unit sections, (e) an example of expanded acoustic waveforms for the starting point candidate and the ending point candidate, (f) an example of frequency vectors in third unit sections, and (g) the third unit sections. $\sigma max$ has already been calculated by the section lengthening reference index calculating unit 208. Here, it is assumed that $\sigma max = 0.1$. As shown by the variance in FIG. 12B, the variance $\sigma stc$ of the starting point candidate Stc is 0.25. As this value is larger than $\sigma max$, a detailed structure is determined to exist. Furthermore, the variance $\sigma etc$ of the ending point Etc is 0.03. As this value is smaller than $\sigma max$, a detailed structure is determined not to exist in Etc. In FIG. 15, (e) through (g) schematically represent the status of the frequency vector of each third unit section, which is a shorter unit section than the second unit section. Since a detailed time structure exists in the sub-hierarchy of the starting point candidate Stc (the detailed time structure (detailed structure) being a structure in which different third unit sections have frequency vectors with different characteristics), the variance value is large.

The example in FIGS. 12A and 12B shows a small variance (0.03), since the third unit sections included in the second unit section of the ending point candidate Etc do not include a detailed structure, even though a gradual change can be observed. Note that while not shown in FIG. 15, in this case the detailed structure determining unit 210 determines whether the second unit section immediately after the ending point candidate Etc, i.e. immediately after the interesting section candidate, includes a detailed structure. That is, the detailed structure determining unit 211 determines whether the variance exceeds the maximum variance value.

3-2-11. Hierarchy Expansion Unit 211

When the detailed structure determining unit 211 determines that a detailed structure exists, the hierarchy expansion unit 211 has a function to perform hierarchical expansion by dividing the second unit section determined to include a detailed structure into a sub-hierarchy of third unit sections, which are smaller units than the first unit section, determines the true starting point and ending point for the interesting section, and record the interesting section data indicating the interesting section based on this determination in the interesting section storage device 105. When it is determined that the starting point portion (the starting point candidate Stc or the second unit section immediately before the starting point candidate Stc) does not include a detailed structure, the starting point of the interesting section candidate becomes the starting point of the interesting section. When it is determined that the ending point portion (the ending point candidate Etc for the second unit section immediately before the ending point candidate Etc) does not include a detailed structure, the ending point of the interesting section candidate becomes the ending point of the interesting section.

Specifically, the hierarchy expansion unit 211 divides the second unit section determined to include a detailed structure into third unit sections and calculates the third unit section frequency vector for each of the third unit sections. The hierarchy expansion unit 211 uses the third unit section frequency vectors to determine, starting from the third unit section frequency vector closest to the reference section, whether the Euclidean distance to the third unit section frequency vector from the reference vector NF0 exceeds the threshold Rth. The hierarchy expansion unit 211 determines the interesting section by setting the true starting point or ending point of the interesting section to be the starting point or ending point of the third unit section immediately before the third unit section corresponding to the time at which the Euclidean distance is determined to exceed the threshold Rth.

Hierarchical expansion is now described with reference to FIG. 15. The hierarchy expansion unit 211 divides the second unit section of the starting point candidate Stc determined by the detailed structure determining unit 210 to have a detailed structure into third unit sections and calculates the frequency vector of the third unit sections using a method similar to the calculation method for the second unit section. Starting from the third unit section closest to the reference section, the hierarchy expansion unit 211 extends the temporary interesting section candidate depending on whether the Euclidean distance of the corresponding frequency vector exceeds the threshold Rth, setting the true starting point or ending point when the Euclidean distance exceeds the threshold Rth. As shown in (e) and (f), FIG. 15 shows an example in which the starting point interesting section is accurately detected by determining that the Euclidean distance exceeds the threshold at the sixth of the third unit sections from the end of stc and including the third unit sections up to the fifth from the end in the interesting section.

3-3. Anchor Model Creating Device 108

Figure 14:
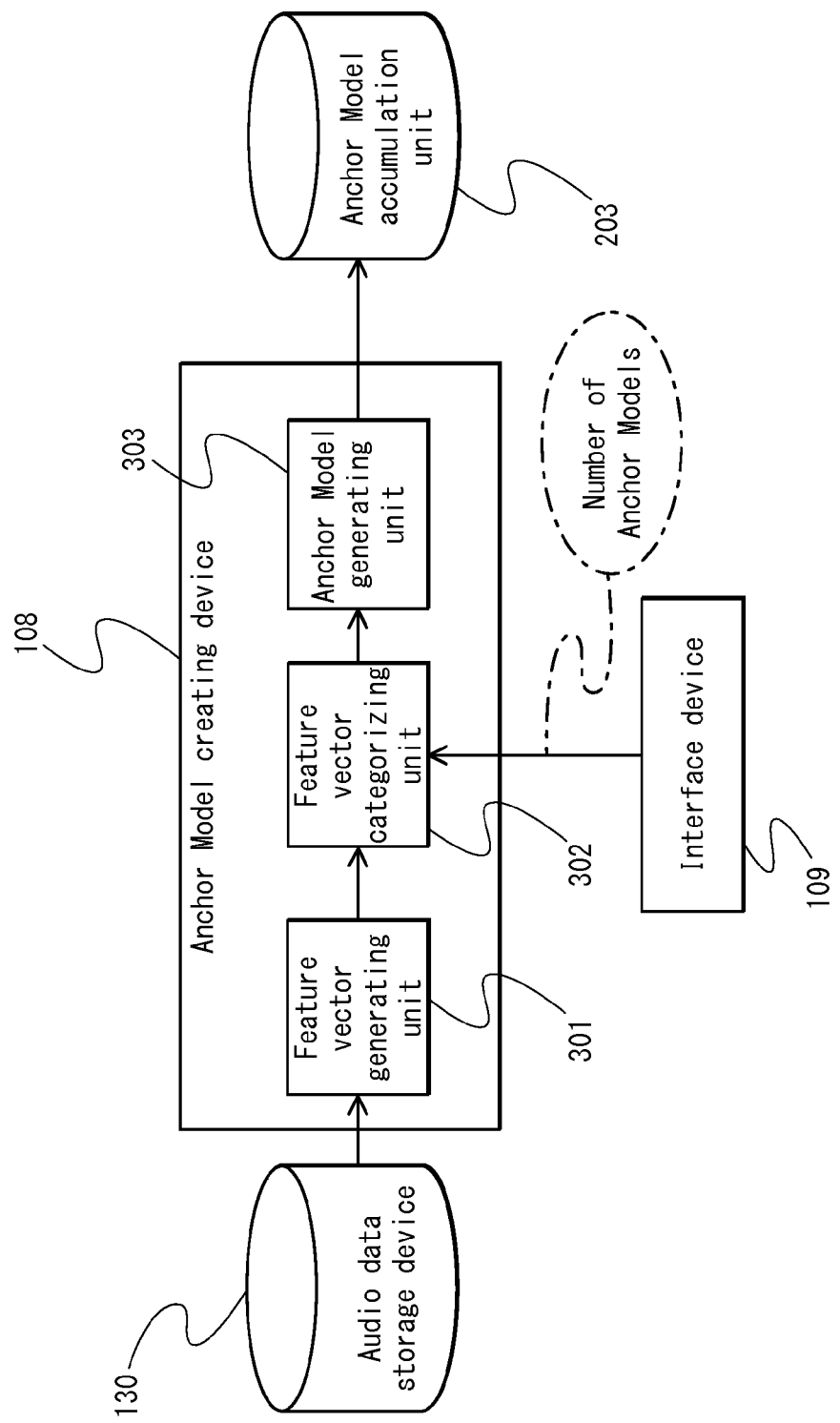
FIG. 14 is a block diagram illustrating an example of the functional structure of an Anchor Model creating device.

The Anchor Model creating device 108 is now described with reference to FIG. 14. FIG. 14 is a functional block diagram illustrating the functional structure and peripheral devices of the Anchor Model creating device 108. The Anchor Model creating device 108 has a function to create Anchor Models based on audio data stored in the audio data storage device 130 and store the created Anchor Models in the Anchor Model accumulation unit 204.

As illustrated in FIG. 14, the Anchor Model creating device 108 is provided with a feature vector generating unit 301, a feature vector categorizing unit 302, and an Anchor Model generating unit 303.

Figure 18:
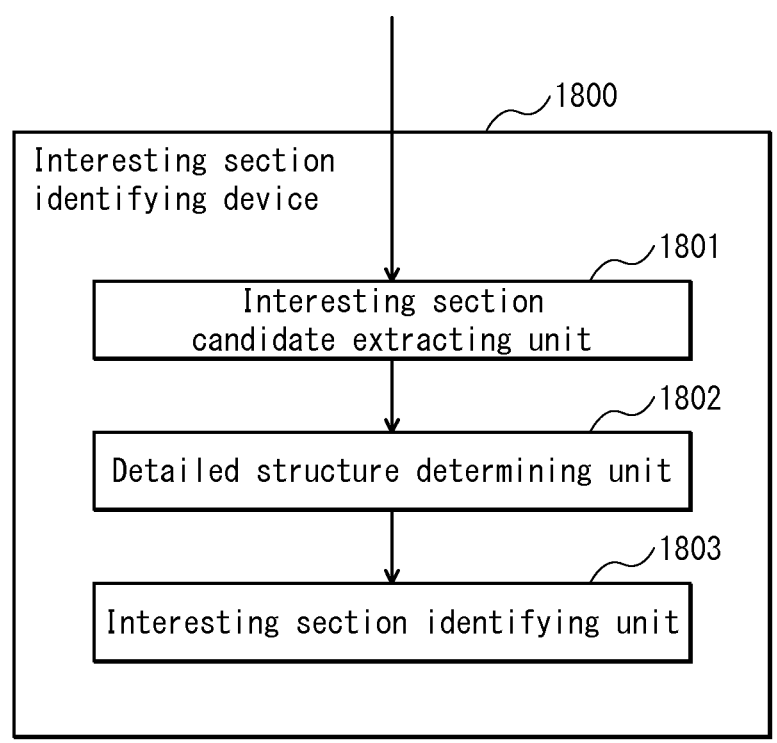
FIG. 18 is a block diagram illustrating a structural example of the interesting section extracting device.

The Anchor Model creating device 108 is composed of a processor (not shown in the figures) and memory (not shown in the figures) and implements the structure shown in FIG. 18 by the processor executing programs read into the memory. In other words, as illustrated in FIG. 18, the Anchor Model creating device 108 implements the feature vector generating unit 301, the feature vector categorizing unit 302, and the Anchor Model generating unit 303.

3-3-1. Feature Vector Generating Unit 301

Like the feature vector generating unit 201 described in section 3-2-1, the feature vector generating unit 301 has a function to divide the audio data acquired from the audio data storage device 130 into first unit sections, calculate the power spectrum $S(\omega)$ for each of the first unit sections by performing audio analysis, convert the calculated power spectrum $S(\omega)$ into a Mel-Cepstrum, and generate a feature vector M. The feature vector generating unit 301 has a function to transmit the generated feature vector M to the feature vector categorizing unit 302.

3-3-2. Feature Vector Categorizing Unit 302

The feature vector categorizing unit 302 has a function to perform clustering on the feature vectors generated by the feature vector generating unit 301.

Based on the K Anchor Models Ar input from the interface device 109, the feature vector categorizing unit 302 divides a plurality of feature vectors M into K clusters by K-means clustering and calculates a representative feature vector that represents each cluster (hereinafter referred to as a cluster feature vector). The clusters correspond to the Anchor Models Ar. Note that in the present embodiment, K=1024.

3-3-3. Anchor Model Generating Unit 303

The Anchor Model generating unit 303 has a function to generate the feature appearance probability function $b_{Ar}(M)$ corresponding to each Anchor Model Ar based on the cluster feature vector of each cluster. The Anchor Model generating unit 303 also has a function to store the Anchor Models Ar represented by the calculated feature appearance probability functions in the Anchor Model accumulation unit 203.
Operations The following describes operations of the interesting section extracting device according to the present embodiment with reference to the flowchart FIG. 16 and the functional block diagram in FIG. 7.

First, the audio extracting device 102 extracts, from the content storage device 103, an audio signal included in the video file indicated by the user (arrow P1) and outputs the audio signal to the feature vector generating unit 201 (arrow P2).

Next, the feature vector generating unit 201 generates feature vectors from the input audio signal and outputs the feature vectors to the likelihood vector generating unit 202 (arrow P3).

Subsequently, the likelihood vector generating unit 202 generates a likelihood vector F for each first unit section from the input feature vectors and the Anchor Models Ar acquired from the Anchor Model accumulation unit 203 (arrow P4), and stores the first unit section being targeted for calculation in the likelihood vector buffer 204 in association with time information (arrow P5, step S1601).

Furthermore, the frequency vector/variance generating unit 205 acquires a plurality of likelihood vectors F (likelihood vectors for the second unit sections) stored in the likelihood vector buffer 204 (arrow P6) and generates frequency vectors NF. The frequency vector/variance generating unit 205 stores the generated frequency vectors NF in the frequency vector buffer 206 (arrow P7, step S1602). This processing terminates upon receipt, from the interesting section candidate extracting unit 207, of a frequency vector generation completion instruction and begins upon receipt of the frequency vector generation start instruction (arrow P9).

Meanwhile, the section lengthening reference index calculating unit 208 acquires a plurality of frequency vectors NF, including the frequency vector NF corresponding to the designated time, from the frequency vector buffer 206 (arrow P11), acquires information on the designated time from the designated time acquiring unit 209 (arrow P12), and calculates the reference vector NF0, the threshold Rth, and the maximum variance value σmax. The section lengthening reference index calculating unit 208 then outputs the generated reference vector NF0, threshold Rth, and maximum variance value σmax to the interesting section candidate extracting unit 207 (arrow P13).

The interesting section candidate extracting unit 207 determines whether the second unit section including the target time belongs to the temporary interesting section candidate by using the frequency vector NF acquired from the frequency vector buffer 206 (arrow P8), the reference vector NF0, the threshold Rth, and the maximum variance value σmax input by the section lengthening reference index calculating unit 208 (arrow P13), and the information on the designated time input from the designated time acquiring unit 209 (arrow P15). At this point, while shifting the target time one second unit section at a time from the designated time T0, the interesting section candidate extracting unit 207 determines whether the length between the target time and the designated time T0 is shorter than the preset interesting section length le. Upon determining that the length between the target time and the designated time T0 is shorter than the preset interesting section length le, the interesting section candidate extracting unit 207 sets the second unit section including the target time as the interesting section candidate and outputs the interesting section candidate to the detailed structure determining unit 210 (arrow P16, step S1603).

The detailed structure determining unit 210 determines whether the variance σstc for the starting point candidate Stc input from the interesting section candidate extracting unit 207 exceeds the maximum variance σmax acquired from the section lengthening reference index calculating unit 208 (step S1604).

If the variance of the starting point candidate Stc satisfies σstc>σmax (step S1604: YES), the detailed structure determining unit 210 notifies the hierarchy expansion unit 211 that the starting point candidate Stc includes a detailed structure (arrow P17). Upon receiving this notification, the hierarchy expansion unit 211 divides the starting point candidate Stc into third unit sections (100 ms), calculates the respective frequency vectors, and determines the true starting point of the interesting section (step S1605).

On the other hand, if the variance of the starting point candidate Stc does not satisfy σstc>σmax (step S1604: NO), the detailed structure determining unit 210 determines whether the second unit section immediately before the starting point candidate Stc (the second unit section immediately before the interesting section candidate) includes a detailed structure (step S1606).

If the variance of the second unit section immediately before the starting point candidate Stc exceeds σmax (step S1606: YES), the detailed structure determining unit 210 notifies the hierarchy expansion unit 211 that the second unit section immediately before the starting point candidate Stc includes a detailed structure (arrow P17). Upon receiving this notification, the hierarchy expansion unit 211 divides the second unit section immediately before the starting point candidate Stc into third unit sections (100 ms), calculates the respective frequency vectors, and determines the true starting point of the interesting section (step S1605).

On the other hand, if the variance of the second unit section immediately before the starting point candidate Stc does not exceed σmax (step S1606: NO), the detailed structure determining unit 210 notifies the hierarchy expansion unit 211 that the starting point portion of the interesting section candidate does not include a detailed structure (arrow P17). Upon receiving this notification, the hierarchy expansion unit 211 determines that the starting point of the interesting section candidate is the starting point of the interesting section (step S1608).

The interesting section extracting device performs similar processing at the endpoint of the interesting section candidate to make determinations such as whether a detailed structure exists.

The detailed structure determining unit 210 determines whether the variance σetc for the ending point candidate Etc input from the interesting section candidate extracting unit 207 exceeds the maximum variance σmax acquired from the section lengthening reference index calculating unit 208 (step S1609).

If the variance of the ending point candidate Etc satisfies σetc>σmax (step S1609: YES), the detailed structure determining unit 210 notifies the hierarchy expansion unit 211 that the ending point candidate Etc includes a detailed structure (arrow P17). Upon receiving this notification, the hierarchy expansion unit 211 divides the ending point candidate Etc into third unit sections (100 ms), calculates the respective frequency vectors, and determines the true ending point of the interesting section (step S1610).

On the other hand, if the variance of the ending point candidate Etc does not satisfy σetc>σmax (step S1609: NO), the detailed structure determining unit 210 determines whether the second unit section immediately after the ending point candidate Etc (the second unit section immediately after the interesting section candidate) includes a detailed structure (step S1611).

If the variance of the second unit section immediately after the ending point candidate Etc exceeds σmax (step S1611: YES), the detailed structure determining unit 210 notifies the hierarchy expansion unit 211 that the second unit section immediately after the ending point candidate Etc includes a detailed structure (arrow P21). Upon receiving this notification, the hierarchy expansion unit 211 divides the second unit section immediately after the ending point candidate Etc into third unit sections (100 ms), calculates the respective frequency vectors, and determines the true ending point of the interesting section (step S1612).

On the other hand, if the variance of the second unit section immediately after the ending point candidate Etc does not exceed σmax (step S1611: NO), the detailed structure determining unit 210 notifies the hierarchy expansion unit 211 that the ending point portion of the interesting section candidate does not include a detailed structure (arrow P17). Upon receiving this notification, the hierarchy expansion unit 211 determines that the ending point of the interesting section candidate is the ending point of the interesting section (step S1613).

The hierarchy expansion unit 211 then stores interesting section data indicating the interesting section based on the determined starting point and ending point in the interesting section storage device 105 (arrow P18). The interesting section extracting device thus terminates extraction of the interesting section corresponding to one designated time.

SUMMARY

As described above, the interesting section extracting device extracts an interesting section candidate, which is a candidate to become an interesting section, and then determines the starting point and the ending point of the interesting section from the starting point portion and the ending point portion of the interesting section candidate using shorter time units (third unit sections) than the time units used for determining the interesting section candidate (second unit sections). The interesting section extracting device therefore extracts the interesting section more appropriately then when extracting the interesting section using only the second unit sections. Furthermore, when determining the interesting section, the interesting section extracting device determines whether a detailed structure exists by calculating variances in the starting point portion and the ending point portion, only using the third unit sections to determine the starting point and the ending point of the interesting section when a detailed structure exists. By not performing calculations when it is unnecessary to use the third unit sections to determine the starting point and ending point, the interesting section extracting device can reduce the amount of calculation.

Modifications

An interesting section extracting device according to the present invention has been described in accordance with the above embodiment, but the present invention is not limited in this way. The following describes modifications that are included in the concept of the present invention.

(1) In the above embodiment, the detailed structure determining unit 210 determines whether a detailed structure is included in the starting point candidate and the second unit section that is immediately before, as well as in the ending point candidate and the second unit section that is immediately after. The target of the determination by the detailed structure determining unit 210 regarding whether a detailed structure is included is not, however, limited to these four second unit sections and rather may be performed over the entire interesting section candidate.

Determining whether a detailed structure occurs throughout the interesting section allows, for example, for identification of the scene that is the most likely within the video in the interesting section.

(2) In the above embodiment, while not specifically mentioned, the interesting section extracting device may extract an interesting section using a method such as the one described below.

For example, the interesting section candidate extracting unit 207 may determine whether speech is included in the audio signal and then extract an interesting section.

The determination of whether speech is included in the audio signal of the second unit section may, for example, be made by setting the Anchor Model to be a specific Anchor Model that indicates speech and determining whether the likelihood for the Anchor Model exceeds a predetermined threshold (for example, 0.8).

At this point, when the audio signal has been determined to be speech, the hierarchy expansion unit 211 may extract the interesting section by determining whether the likelihood factor of the first unit section is within the threshold Rth from the reference vector NF0, instead of dividing the second unit section into third unit sections. When speech is included, analyzing in greater detail allows for more accurate determination of the starting and ending points of the interesting section.

(3) In the above embodiment, the frequency vector in the second unit section and in the third unit section has been described as a vector whose components are the normalized cumulative likelihood of the likelihood vector components included in the respective section. The frequency vector may have components other than normalized cumulative likelihood, however, provided that the frequency vector represents characteristics of the audio signal in the corresponding section, in particular provided that the frequency vector identifies components of frequently occurring sounds. For example, the components of the likelihood factors included in this unit section may be accumulated, and the frequency vector may be the normalized cumulative likelihood of only the k Anchor Models having the highest k cumulative likelihoods (k being a number≥2, such as 10). Alternatively, the components of the frequency vector may be cumulative likelihoods that have not been normalized.

(4) The interesting section candidate extracting unit 207 has been described as determining whether the length of time from the designated time until the target time is equal to or less than a predetermined time, yet this is a measure taken so that the interesting section will not exceed a predetermined length. If the length of the interesting section is not limited, this determination may be omitted.

(5) In the above embodiment, it is determined whether a detailed structure exists based on the determination of whether the variance exceeds a predetermined threshold. A different method for determining whether a detailed structure exists, however, may be used as long as such a method allows for determination of whether a plurality of types of sounds occur in the second unit section.

For example, in the second unit section, two likelihood vectors may be arbitrarily chosen, and it may be determined whether the distance between the two likelihood vectors is at least a predetermined threshold.

In this case, determining the distance between all possible arbitrary pairs of likelihood vectors leads to a vast amount of calculation, and therefore it is not necessary to determine the distance between all possible arbitrary pairs of likelihood vectors. For example, it may be determined whether a detailed structure exists in one second unit section by working inwards from the edges of the second unit section, successively calculating the distance between likelihood vectors in two continuous first unit sections. It may then be determined whether a detailed structure exists based on the change in distance between the likelihood vectors. For example, it may be determined that a detailed structure exists in a second unit section when the Euclidean distance between likelihood vectors changes by continuing to increase, and after the Euclidean distance reaches a certain amount, starting to decrease. By using this method, the calculation of the distance between likelihood vectors need only be performed 50 times when the first unit section is 10 ms and the second unit section is 1 s.

Figure 16:
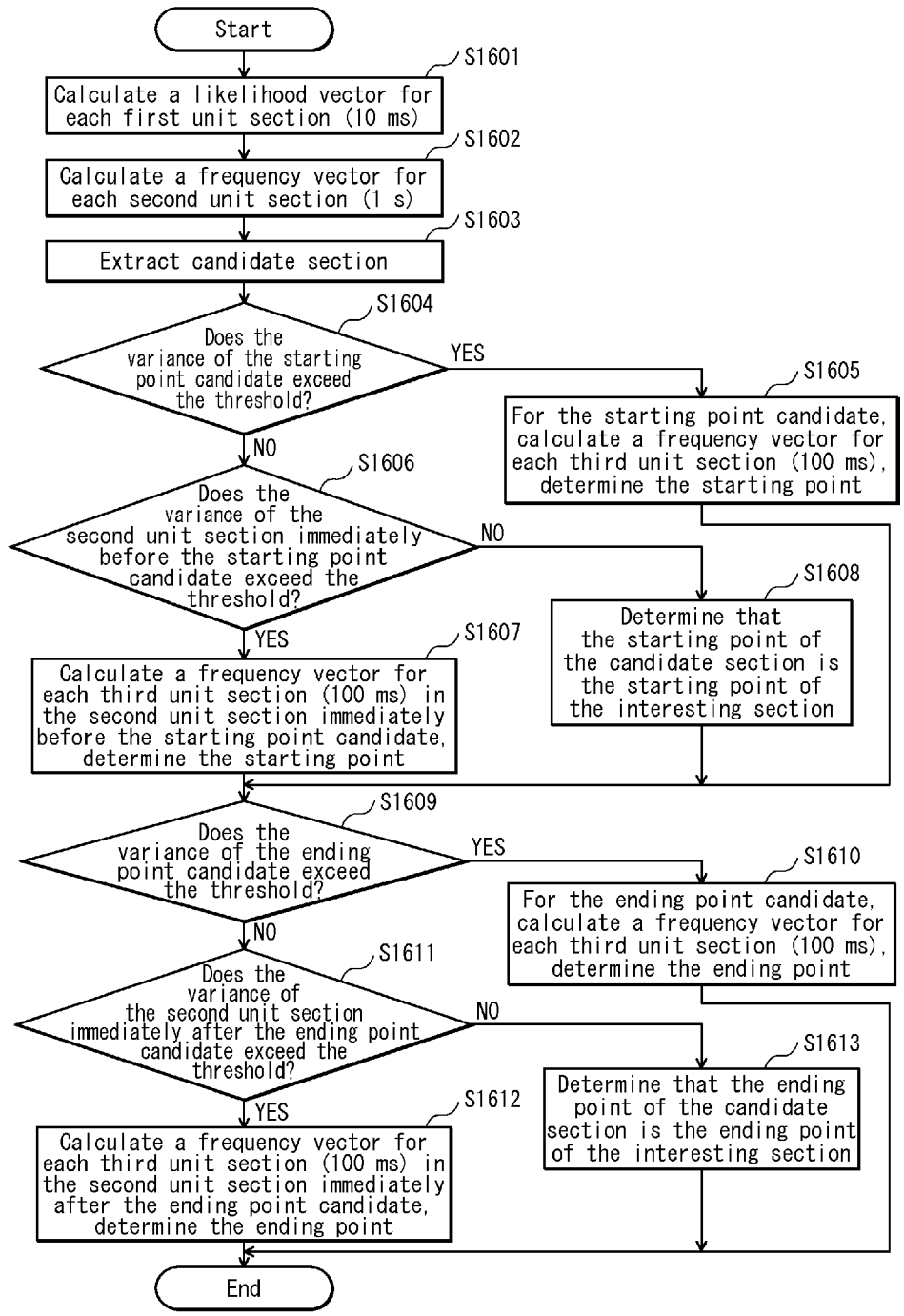
FIG. 16 is a flowchart illustrating interesting section extracting operations by the interesting section extracting device.

(6) In the above embodiment, the processing in steps S1604 through S1608 may be performed after the processing in steps S1609 through S1613 in FIG. 16, or these sets of steps may be performed in parallel.

(7) While not particularly mentioned in the above embodiment, a plurality of designated times may be received from the user via the interface device 109, and a plurality of interesting sections including the designated times may be extracted.

The video editing device may be provided with a function for recording the plurality of interesting sections extracted by the interesting section extracting device in the order of playback, or in the order in which the AV contents were recorded, in an internal or external recording device. At that time, the AV contents corresponding to the interesting sections may have been extracted from a plurality of files. Furthermore, when recording the plurality of pieces of data corresponding to the plurality of interesting sections, pieces of data may be recorded in one file, in order of the corresponding designated times, as a consolidated digest video. At that time, when adjacent interesting sections overlap, the digest video should be consolidated so that the overlapping sections are not repeated.

Furthermore, the hierarchy expansion unit 211 may be provided with a similar function to record a plurality of extracted interesting sections in the interesting section storage device 105 using the above method.

(8) New audio data may be added as necessary to the audio data stored in the audio data storage device 130 of the above embodiment, or the audio data in the video file stored in the content storage device 103 may be stored in the audio data storage device 130.

When new audio data is added, the Anchor Model creating device 108 may create new Anchor Models.

(9) In the above embodiment, an example has been described in which Anchor Models Ar are created for a plurality of sound types automatically from audio data accumulated in advance in the audio data storage device 130 (i.e. so-called unsupervised creation of Anchor Models). The method of Anchor Model creation is not, however, limited in this way. For example, when the sound types are limited to being few in number (for example, several dozen types), the method of Anchor Model creation may be to have the user select a piece of audio data corresponding to each sound piece from the audio data accumulated in the audio data storage device 130, provide a type label to each piece of audio data, and create an Anchor Model for a sound piece to which corresponds pieces of audio data with the same type label (i.e. so-called supervised creation of Anchor Models Ar).

(10) In the above embodiment, upon determining that the Euclidean distance does not exceed the threshold Rth (i.e. inclusion in the interesting section candidate) and that the length between the target time and the designated time T0 is shorter than the preset interesting section length le (i.e. upon determining that the conditions for the interesting section are met), the interesting section candidate extracting unit 207 sets the second unit section that includes the target time and is defined by the starting point candidate Stc and the ending point candidate Etc as the interesting section candidate. This is a measure taken to prevent the length of the interesting section from exceeding a certain length. If the length of the interesting section need not be kept below a certain length, this determination (the comparison with the predetermined interesting section length le) need not be performed.

Furthermore, while details have been provided in the above embodiment on processing for when the temporary interesting section candidate is longer than le, this processing may, for example, be as follows.

For example, the interesting section candidate extracting unit 207 may first expand the temporary interesting section candidate in the reverse direction of the time axis and then expand the temporary interesting section candidate in the forward direction of the time axis, determining the temporary interesting section candidate to be the interesting section candidate at the point in time at which the length of the temporary interesting section candidate exceeds le. Note that the order of expansion may be to expand first in the forward direction of the time axis and then in the reverse direction of the time axis.

Alternatively, the interesting section candidate extracting unit 207 may alternate between expanding the temporary interesting section candidate in the forward direction of the time axis and in the reverse direction of the time axis by second unit section. The expansion need not be performed alternately one second unit section at a time, but rather may be performed alternately for a fixed number of second unit sections (for example, five).

(11) In the above embodiment, the interesting section candidate extracting unit 207 determines whether to include, in the temporary interesting section candidate, a second unit section adjacent to the temporary interesting section candidate depending on whether the Euclidean distance between the reference vector and the frequency vector of the second unit section exceeds Rth. Use of the Euclidean distance, however, is not required as long as it can be determined whether the reference vector and the frequency vector of the second unit section have at least a certain correlation.

For example, based on the reference vector, the frequency vector of the second unit section, and the probability distribution of the Anchor Model the reference vector and the frequency vector may be considered as the weights of a mixture distribution, and to represent their features, a reference mixture distribution and a mixture distribution for the second unit section currently targeted for comparison may be calculated. The Kullback-Leibler divergence (also informally referred to as the KL distance) of both of the two mixture distributions may then be used as the distance for extracting the interesting section candidate. At this point, the threshold Rth is calculated from 9 second unit sections also using the Kullback-Leibler divergence.

Note that the Kullback-Leibler divergence is well known in probability theory and information theory as a metric for measuring the difference between two probability distributions. The KL distance between the frequency vector and the reference vector in the present invention may be calculated as follows.

First, the probability function $b_{Ar}(M)$ for each Anchor Model is expressed as a Gaussian distribution $g_{Ar}$.

Next, the features of a second unit section, which is the unit for extending the section, can be allowed to constitute one mixture distribution based on all of the Anchor Models (1024) and the feature vector of the second unit section. Specifically, by considering the frequency vector $H_S$ of the second unit section ($H_S=(\alpha_1, \ldots, \alpha_{Ar}, \ldots, \alpha_{1024})$) to be the weight for the 1024 Anchor Models Ar ($Ar=(g_1, \ldots, g_{Ar}, \ldots, g_{1024})$), the features of the second unit section can be provided by Equation 3 below.

$$G_S = \sum_{Ar=1}^{1024} \alpha_{Ar} g_{Ar} \qquad \text{Equation 3}$$

A similar expression may also be used as another expression of the probabilistic features of the reference vector. Specifically, by considering the reference vector C ($C=(\mu_1, \ldots, \mu_{Ar}, \ldots, \mu_{1024})$) to be the weight for the 1024 Anchor Models Ar ($Ar=(g_1, \ldots, g_{Ar}, \ldots, g_{1024})$), another expression of the features of the probabilistic features of the reference vector can be provided by Equation 4 below.

$$G_C = \sum_{Ar=1}^{1024} \mu_{Ar} g_{Ar} \qquad \text{Equation 4}$$

Using these two mixture distributions $G_S$ and $G_C$, the Kullback-Leibler divergence from $G_S$ to $G_C$ can be provided by Equation 5 below.

$$D_{KL}(G_S | G_C) = E_Y \log \frac{G_S(Y)}{G_C(Y)} \qquad \text{Equation 5}$$

Note that in Equation 5, $E_Y$ represents an expectation.

The Kullback-Leibler divergence from $G_C$ to $G_S$ can be provided by Equation 6 below.

$$D_{KL}(G_C \mid G_S) = E_Y \log \frac{G_C(Y)}{G_S(Y)} \quad \text{Equation 6}$$

By seeking the Kullback-Leibler divergence for both Equations 5 and 6, the KL distance between the two probability distributions may be defined as in Equation 7 below.

$$\text{Dist}(G_C, G_S) = \frac{D_{KL}(G_S \mid G_C) + D_{KL}(G_C \mid G_S)}{2} \quad \text{Equation 7}$$

Instead of the Euclidean distance indicated in the above embodiment, the KL distance indicated in Equation 7 may be used for determining whether to include the second unit section in the temporary interesting section candidate. At this point, instead of the threshold Rth (threshold Euclidean distance), the KL distance (threshold KL distance) from the frequency vector, among the frequency vectors for a plurality of second unit sections included in the reference section, that has the farthest KL distance from the center of mass vector (reference vector) for the plurality of frequency vectors may be used.

As another method not using Euclidean distance, the correlation may be calculated between the reference vector and the frequency vector of the second unit section, for example, and the second unit section may be included in the temporary interesting section candidate when the correlation is at least a certain value (for example, at least 0.6). With this method, instead of the correlation with the reference vector, the correlation may be between the frequency vector of the second unit section that includes the designated time and the frequency vector of the second unit section adjacent thereto (or adjacent to the temporary interesting section candidate) in order to extract the interesting section candidate.

(12) In the above embodiment, the designated time acquiring unit 209 acquires the designated time based on user input that is input into the interface device 109. The method of acquiring the designated time, however, is not limited in this way.

For example, based on changes over time and features of a plurality of pieces of image data included in a video file, the designated time acquiring unit 209 may automatically acquire the designated time T0.

In this case, the designated time acquiring unit 209 calculates a plurality of SIFT features using a typical clustering method for each of a plurality of pieces of image data included in a video file and calculates the designated time T0 based on a predetermined difference in the SIFT features during each piece of image data. For example, focusing on the SIFT feature that represents the background image in each of a plurality of pieces of image data, the designated time T0 may be automatically set when the difference between SIFT features of two pieces of image data that are adjacent along the time axis changes greatly. At this point, the user may indicate a starting point and ending point for a section of the video file from which the designated time T0 is to be acquired.

Detection is not limited to image data, and the designated time may be detected as a point at which a specific sound is detected. For example, a specific user's voice may be detected as the specific sound in a video file, and the point at which the user's voice is detected may be acquired as the designated time. In this case, information indicating features of the specific user's voice are stored in advance, and the user's voice is detected based on whether the audio signal of the video has at least a predetermined correlation to these features. When it is determined that the user's voice occurs in a continuous period, the interesting section is extracted using the center of the continuous period as the designated time.

Instead of the specific sound, the designated time may be a point at which a specific object is detected. In this case, image features indicating the specific object are stored, and the designated time becomes the point at which at least a certain correlation is detected between these image features and the image features detected from image data in the video file.

(13) The lengths of the first unit section, the second unit section, and the third unit section in the above embodiment are only examples. These lengths need not be the number of seconds indicated in the above embodiment, as long as the following relationship holds: first unit section<third unit section<second unit section. Note that processing is easier if the length of the second unit section is a common multiple of the length of the first unit section and the length of the third unit section.

(14) In the above embodiment, the hierarchy expansion unit 211 calculates the third unit section frequency vector for the second unit section determined to include a detailed structure. Alternatively, the third unit section frequency vector used by the frequency vector/variance generating unit 205 for calculating the variance may be used.

(15) In the above embodiment, the interesting section extracting device extracts the interesting section from an input video, but alternatively, the interesting section extracting device may simply identify the interesting section without extracting it.

Figure 17:
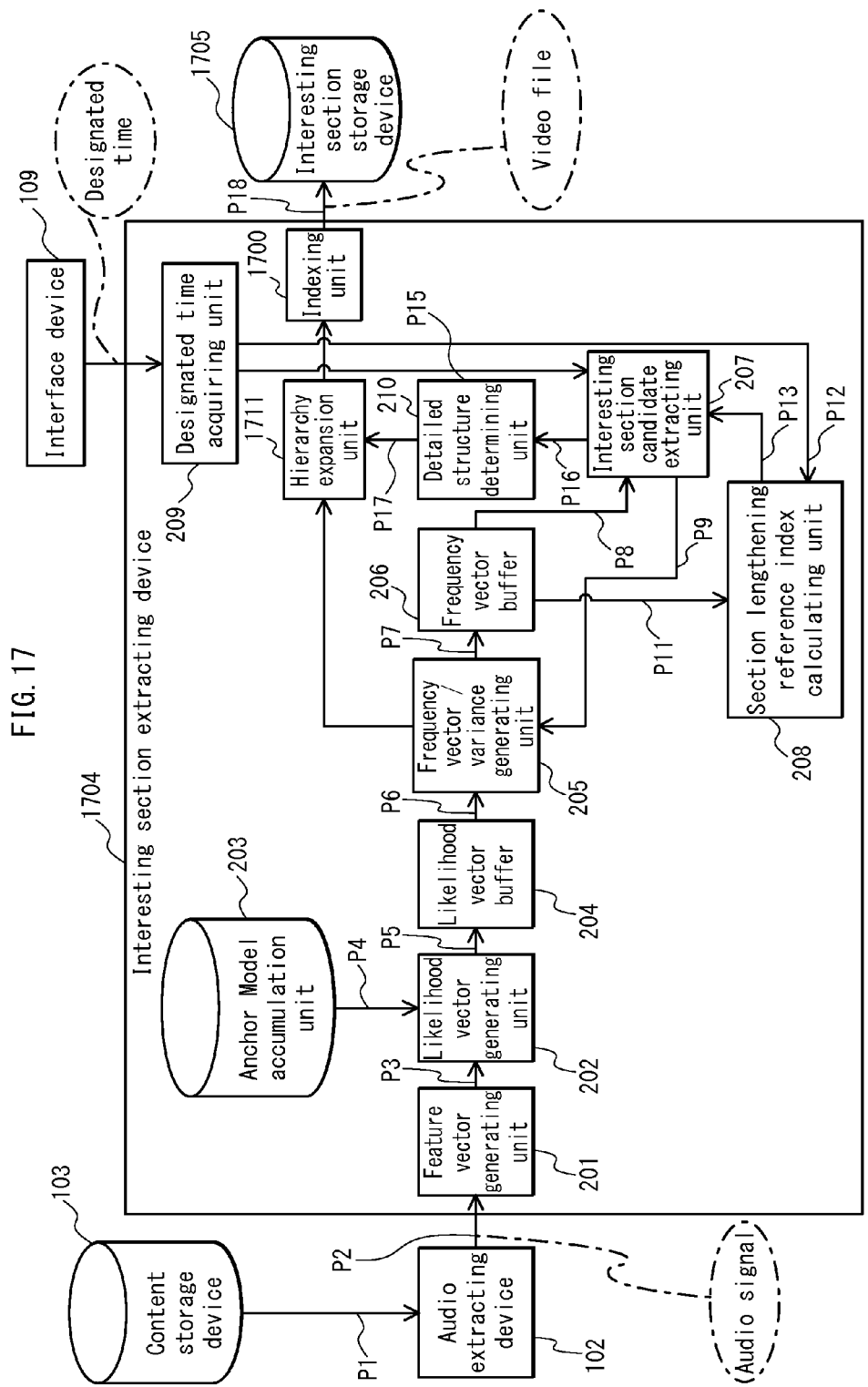
FIG. 17 is a block diagram illustrating a structural example of the interesting section extracting device.

In other words, the interesting section device of the present invention may have the structure illustrated in FIG. 17. The structure illustrated in FIG. 17 is the structure of the interesting section extracting device 104 of the above embodiment illustrated in FIG. 7 with the addition of an indexing unit 1700.

In FIG. 17, the same names and reference signs are used for components having the same functions as the structure illustrated in FIG. 7.

A hierarchy expansion unit 1711 is provided with approximately the same functions as the hierarchy expansion unit 211. Unlike the hierarchy expansion unit 211, however, the hierarchy expansion unit 1711 does not extract an interesting section, but rather only identifies an interesting section. Identification of an interesting section refers to identification of the starting time and the ending time of the interesting section. The hierarchy expansion unit 1711 transmits information on the identified interesting section to the indexing unit 1700.

The indexing unit 1700 is inserted between the hierarchy expansion unit 1711 and the interesting section storage device 105. Based on information on the interesting section transmitted by the hierarchy expansion unit 1711, the indexing unit 1700 provides the corresponding video with the starting flag and ending flag respectively indicating the starting point and the ending point of the interesting section as indicated by the information on the interesting section. Note that when the length of the interesting section is fixed, only the starting flag need be provided to the video.

Thus providing the video with a starting flag and an ending flag for the interesting section allows for random access during video playback by using these flags as reference points. This method also allows for a reduction in the time the user spends viewing unnecessary videos.

(16) In the above embodiment, a designated time is received from the user, an interesting section candidate is determined, and a true interesting section is extracted after determining whether the interesting section candidate includes a detailed structure. The present invention is not, however, limited in this way.

Information on the interesting section candidate (starting time and ending time) may be provided in advance to the video input into the interesting section extracting device, and when extracting the interesting section, the hierarchy expansion unit 211 may determine whether a detailed structure exists in the interesting section candidate thus indicated in advance.

When, for example, a video is provided in advance with chapters, this approach allows for easy correction or other modification if the starting point or ending point of the chapters is inappropriate. When a user who is not skilled in video editing manually adds chapters to video, the starting point, the ending point, and the like of the chapters are often inaccurate. When such a video is input into the interesting section extracting device, the above approach is useful as it allows for easy correction of the chapters.

(17) A control program composed of program code for causing a processor, and circuits connected to the processor, of the video editing device or the like to perform the operations for communication, the interesting section extracting processing, and the like (see FIG. 16) of the above embodiment may be recorded on a recording medium and distributed and circulated over a variety of communication networks or the like. The recording medium may be an IC card, a hard disk, an optical disc, a flexible disk, ROM, or the like. The distributed control program is used by being stored on a processor-readable memory or the like and executed by the processor in order to achieve the various functions described in the embodiment.

(18) A portion or all of the constituent elements composing the interesting section extracting device described in the above embodiment may be implemented as one or a plurality of integrated circuits (IC, LSI, or the like), and other elements may be further added to the constituent elements of the image management device and integrated to form an integrated circuit (one chip).

Although referred to here as an LSI, depending on the degree of integration, the terms IC, system LSI, super LSI, or ultra LSI are also used. In addition, the method for assembling integrated circuits is not limited to LSI, and a dedicated communication circuit or a general-purpose processor may be used. An FPGA (Field Programmable Gate Array), which is programmable after the LSI is manufactured, or a reconfigurable processor, which allows for reconfiguration of the connection and setting of circuit cells inside the LSI, may be used. Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

Supplementary Explanation

In the above embodiment, an interesting section identifying device according to an aspect of the present invention has been described, but aspects of the present invention are not limited in this way. The following describes an aspect of the present invention and the advantages effects achieved thereby.

(a) As shown in FIG. 18, an interesting section identifying device according to the present invention is for identifying an interesting section of a video file based on an audio signal included in the video file, the interesting section being a section in which a user is estimated to express interest, the interesting section identifying device comprising an interesting section candidate extracting unit (1801) configured to extract an interesting section candidate from the video file, the interesting section candidate being a candidate for the interesting section; a detailed structure determining unit (1802) configured to determine whether the interesting section candidate includes a specific detailed structure; and an interesting section identifying unit (1803) configured to identify the interesting section by analyzing a specific section when the detailed structure determining unit determines that the interesting section candidate includes the detailed structure, the specific section including the detailed structure and being shorter than the interesting section candidate.

The interesting section candidate extracting unit 1801 illustrated in FIG. 18 corresponds to the interesting section candidate extracting unit 207 in FIGS. 7 and 17. The detailed structure determining unit 1802 corresponds to the detailed structure determining unit 210 in FIGS. 7 and 17. Finally, the interesting section identifying unit 1803 corresponds to the hierarchy expansion units 211 and 1711 in FIGS. 7 and 17. The interesting section identifying device illustrated in FIG. 18 may further include the feature vector generating unit 201, the likelihood vector generating unit 202, the Anchor Model accumulation unit 203, the likelihood vector buffer 204, the frequency vector/variance generating unit 205, the frequency vector buffer 206, the section lengthening reference index calculating unit 208, and the indicated time acquiring unit 209 illustrated in FIG. 7. The connections between these functional units are as illustrated in FIG. 7.

The detailed structure is as illustrated in the above embodiment. In other words, the detailed structure may be described as a structure, within a shorter time interval in the interesting section candidate, in which sound features exhibit at least a predetermined amount of variation (change). Another way of describing the determination of whether the detailed structure is included is to detect a section having, to a certain extent, common sound features, yet in which sound features vary when examined over short units of time.

An interesting section identifying method according to the present invention is used in an interesting section identifying device for identifying an interesting section of a video file based on an audio signal included in the video file, the interesting section being a section in which a user is estimated to express interest, the interesting section identifying method comprising the steps of: (a) extracting an interesting section candidate from the video file, the interesting section candidate being a candidate for the interesting section; (b) determining whether the interesting section candidate includes a specific detailed structure; and (c) identifying the interesting section by analyzing a specific section when the interesting section candidate is determined in step (d) to include the detailed structure, the specific section including the detailed structure and being shorter than the interesting section candidate.

An interesting section identifying program according to the present invention is for causing a computer to perform interesting section identifying processing for identifying an interesting section of a video file based on an audio signal included in the video file, the interesting section being a section in which a user is estimated to express interest, the interesting section identifying processing comprising the steps of: (a) extracting an interesting section candidate from the video file, the interesting section candidate being a candidate for the interesting section; (b) determining whether the interesting section candidate includes a specific detailed structure; and (c) identifying the interesting section by analyzing a specific section when the interesting section candidate is determined in step (d) to include the detailed structure, the specific section including the detailed structure and being shorter than the interesting section candidate.

An interesting section identifying integrated circuit for identifying an interesting section based on an audio signal included in a video file, the interesting section being interesting for a user and including a designated time, the interesting section identifying integrated circuit comprising: an interesting section candidate extracting unit configured to extract an interesting section candidate from the video file, the interesting section candidate being a candidate for the interesting section; a detailed structure determining unit configured to determine whether the interesting section candidate includes a specific detailed structure; and an interesting section identifying unit configured to identify the interesting section by analyzing a specific section when the detailed structure determining unit determines that the interesting section candidate includes the detailed structure, the specific section including the detailed structure and being shorter than the interesting section candidate.

These structures allow for identification of an interesting section in a video file which may, for example, be used for skip playback during playback of the video file, for creation of a digest, or the like. The interesting section may also be used to show the user only a section of the video file in which the user is estimated to express interest.

With these structures, when the interesting section is extracted from a video file (AV content), the user need not painstakingly designate two times to indicate the start and the end of the section. Rather, the interesting section identifying device identifies the interesting section by accurately determining the starting point or the ending point of the interesting section (when a detailed structure is determined to be included), thereby accurately identifying the interesting section without the user needing to input a precise starting point or ending point.

(b) In the interesting section identifying device of (a), the interesting section identifying device may further comprise an Anchor Model storage unit configured to store Anchor Models expressing features of each of a plurality of sound types that serve as a reference; a designated time acquiring unit configured to acquire a designated time from the user; and a likelihood vector generating unit configured to calculate, for each of a plurality of first unit sections of the audio signal, a likelihood of a feature vector for each of the Anchor Models, the feature vector indicating features of the audio signal in the first unit section, and to generate a likelihood vector having the calculated likelihoods as components, wherein the interesting section candidate extracting unit extracts the interesting section candidate based on the likelihood vector so that the interesting section candidate includes the designated time and is longer than the first unit section, and the detailed structure determining unit determines whether the detailed structure is included in the specific section within a portion that includes the interesting section candidate, the specific section being longer than the first unit section and shorter than the interesting section candidate.

This structure allows for identification of the interesting section based on input received at the point at which the user found the video interesting. With the input of the point at which the user found the video interesting, the interesting section identifying device can identify the interesting section without a precise starting point or ending point.

(c) In the interesting section identifying device of (b), the interesting section identifying device may further comprise a frequency vector calculating unit configured to calculate a second unit section frequency vector from N likelihood vectors generated from the audio signal in each of a plurality of second unit sections, each second unit section being N times longer than the first unit section, and to calculate a third unit section frequency vector from M likelihood vectors generated from the audio signal in each of a plurality of third unit sections, each third unit section being M times longer than the first unit section, where 1<M<N, and N is a multiple of M; and a variance calculating unit configured to calculate a variance of the third unit section frequency vectors in the third unit sections included in the second unit section, wherein the specific section is the second unit section, the interesting section candidate extracting unit extracts the interesting section candidate based on the second unit section frequency vector, and the detailed structure determining unit determines whether the detailed structure is included based on whether the variance exceeds a reference value.

With this structure, the interesting section identifying device determines whether the detailed structure is included by using a variance calculated with frequency vectors of third unit sections included in a second unit section. Therefore, when the detailed structure is included, the interesting section identifying device identifies the interesting section more precisely by analyzing the specific section with the detailed structure.

(d) In the interesting section identifying device of (c), the interesting section identifying device may further comprise a reference index calculating unit configured to calculate a reference vector based on a plurality of second unit section frequency vectors in a reference section composed of a plurality of continuous second unit sections that include the designated time, and to assign, to the reference value, a largest one of the variances of the second unit sections included in the reference section, wherein the interesting section candidate extracting unit initially designates the reference section as a temporary interesting section candidate and repeats a process of (i) determining whether the second unit section frequency vector of a second unit section adjacent to the temporary interesting section candidate has at least a predetermined correlation to the reference vector and (ii) including the second unit section adjacent to the temporary interesting section candidate in the temporary interesting section candidate when determining that the second unit section frequency vector and the reference vector have at least the predetermined correlation, the interesting section candidate extracting unit terminating repetition of the process and designating the temporary interesting section candidate as the interesting section candidate upon determining that the second unit section frequency vector and the reference vector do not have at least the predetermined correlation.

With this structure, the interesting section identifying device uses the reference vector for the reference section to extract, as the interesting section candidate, not only the second unit section including the designated time, but rather second unit sections having sound features that are at least somewhat similar to the second unit section including the designated time. By using the reference vector instead of the frequency vector of the second unit section corresponding to the designated time, the interesting section identifying device can widen the extraction of the interesting section candidate.

(e) In the interesting section identifying device of (d), the reference index calculating unit may be further configured to calculate a threshold Euclidean distance as a Euclidean distance from the reference vector to a second unit section frequency vector having a greatest Euclidean distance from the reference vector among a plurality of second unit section frequency vectors included in the reference section, and the interesting section candidate extracting unit may initially designate the reference section as a temporary interesting section candidate and repeat a process of (i) determining whether the Euclidean distance from the reference vector to the second unit section frequency vector of the second unit section adjacent to the temporary interesting section exceeds the threshold Euclidean distance and (ii) including the second unit section adjacent to the temporary interesting section candidate in the temporary interesting section candidate when determining that the Euclidean distance does not exceed the threshold Euclidean distance, the interesting section candidate extracting unit terminating repetition of the process and designating the temporary interesting section candidate as the interesting section candidate upon determining that the Euclidean distance exceeds the threshold Euclidean distance.

(f) In the interesting section identifying device of (e), the reference index calculating unit may be further configured to calculate a threshold KL (Kullback-Leibler) divergence as a KL divergence from the reference vector to a second unit section frequency vector having a greatest KL divergence from the reference vector among a plurality of second unit section frequency vectors included in the reference section, and the interesting section candidate extracting unit may initially designate the reference section as a temporary interesting section candidate and repeat a process of (i) determining whether the KL divergence from the reference vector to the second unit section frequency vector of the second unit section adjacent to the temporary interesting section exceeds the threshold KL divergence and (ii) including the second unit section adjacent to the temporary interesting section candidate in the temporary interesting section candidate when determining that the KL divergence does not exceed the threshold KL divergence, the interesting section candidate extracting unit terminating repetition of the process and designating the temporary interesting section candidate as the interesting section candidate upon determining that the KL divergence exceeds the threshold KL divergence.

With this structure, the interesting section extracting device extracts the interesting section candidate, which is a candidate for the interesting section, in accordance with indices calculated based on the reference section. The structure that uses the KL distance increases the reliability of interesting section candidate extraction by using the KL distance, which is widely used in probability theory and information theory as a metric for measuring the difference between two probability distributions.

(g) In the interesting section identifying device of (f), the detailed structure determining unit may determine whether the detailed structure is included in an initial second unit section or a final second unit section of the interesting section candidate, and the interesting section identifying unit may identify a starting point of the interesting section by analyzing the initial second unit section when the detailed structure is determined to be included in the initial second unit section, and identify an ending point of the interesting section by analyzing the final second unit section when the detailed structure is determined to be included in the final second unit section.

With this structure, the interesting section identifying device determines whether each second unit section includes the detailed structure, thereby decreasing the range of determination of whether the detailed structure is included and reducing the processing load as compared to when examining the entire candidate section when determining whether the detailed structure is included.

(h) In the interesting section identifying device of (f), when determining that the detailed structure is not included in the initial second unit section of the interesting section candidate, the detailed structure determining unit may determine whether the detailed structure is included in a second unit section immediately before the interesting section candidate, and the interesting section identifying unit may identify the starting point of the interesting section by analyzing the second unit section immediately before the interesting section candidate when the detailed structure is determined to be included in the second unit section immediately before the interesting section candidate, and designate a starting point of the interesting section candidate as the starting point of the interesting section when the detailed structure is determined not to be included in the second unit section immediately before the interesting section candidate.

With this structure, the interesting section extracting device identifies a range that is not included in the interesting section candidate but which actually should be included in the interesting section, thereby more accurately determining the starting point of the interesting section.

(i) In the interesting section identifying device of (f), when determining that the detailed structure is not included in the final second unit section of the interesting section candidate, the detailed structure determining unit may determine whether the detailed structure is included in a second unit section immediately after the interesting section candidate, and the interesting section identifying unit may identify the ending point of the interesting section by analyzing the second unit section immediately after the interesting section candidate when the detailed structure is determined to be included in the second unit section immediately after the interesting section candidate, and designate an ending point of the interesting section candidate as the ending point of the interesting section when the detailed structure is determined not to be included in the second unit section immediately after the interesting section candidate.

With this structure, the interesting section extracting device identifies a range that is not included in the interesting section candidate but which actually should be included in the interesting section, thereby more accurately determining the ending point of the interesting section.

(j) In the interesting section identifying device of (d), when a second unit section determined to include the detailed structure is included in the interesting section candidate, a portion of the interesting section candidate excluding the second unit section may be designated as a second temporary interesting section candidate, and when the second unit section determined to include the detailed structure is not included in the interesting section candidate, the interesting section candidate may be designated as the second temporary interesting section candidate, and in a second unit section determined to include the detailed structure, the interesting section identifying unit may repeat a process, for successive third unit sections starting from a third unit section closest to the reference section, of (i) determining whether the Euclidean distance from the reference vector to the third unit section frequency vector of the third unit section exceeds the threshold Euclidean distance and (ii) including the third unit section in the second temporary interesting section candidate when determining that the Euclidean distance does not exceed the threshold Euclidean distance, the interesting section identifying unit terminating repetition of the process and designating a starting point or an ending point of the second temporary interesting section candidate as a starting point or an ending point of the interesting section candidate upon determining that the Euclidean distance exceeds the threshold Euclidean distance.

With this structure, the interesting section extracting device more accurately extracts the interesting section by determining the starting point and the ending point of the interesting section based on the third unit section, which is smaller than the second unit section.

(k) In the interesting section identifying device of (d), the interesting section identifying device may further comprise a distinguishing unit configured to distinguish whether a target for determination of inclusion of the detailed structure is a human voice, wherein when the distinguishing unit determines that the target is a human voice, the interesting section identifying unit recursively analyzes, in units of the first unit section, the second unit section determined to include the detailed structure.

With this structure, the interesting section identifying device determines whether the audio signal includes speech in the second unit section determined to include the detailed structure and, when determining affirmatively, performs analysis in units of the first unit sections, which are smaller than the third unit section, thereby more accurately extracting the interesting section.

(l) In the interesting section identifying device of (b), the detailed structure determining unit may determine whether the detailed structure is included in every second unit section throughout the interesting section candidate.

With this structure, the interesting section identifying device can examine the entire candidate section when determining whether the detailed structure is included. This allows for a more detailed analysis. For example, if the detailed structure is included partway through the candidate section, it may be estimated that a likely highlight scene is included in the video file at that point.

(m) In the interesting section identifying device of (b), the designated time acquiring unit may acquire a plurality of designated times, the interesting section identifying unit may identify an interesting section corresponding to the plurality of designated times, and the interesting section identifying device may further comprise a recording unit configured to record, in an external storage device, the interesting section corresponding to the plurality of designated times in chronological order as indicated by the plurality of designated times.

With this structure, the interesting section identifying device can extract the interesting section after receiving the designation of a plurality of designated times. This structure is particularly useful when the user expresses interest in a plurality of scenes. Furthermore, since the interesting section extracting device can record the video file data corresponding to the extracted plurality of interesting sections on a recording medium in chronological order, the video file for the recorded interesting sections appears natural to the user when viewed.

(n) In the interesting section identifying device of (m), the recording unit may store the interesting section corresponding to the plurality of designated times in the external storage device as consolidated data consolidated in chronological order as indicated by the plurality of designated times.

With this structure, the interesting section identifying device can record the portion of the video file corresponding to the plurality of interesting sections in one file (consolidated data), thereby making it more convenient to view the data corresponding to the interesting sections stored in the external storage device.

(o) In the interesting section identifying device of (b), the interesting section identifying device may further comprise a specific time frame designating unit configured to accept user input of designation of a specific time frame in terms of playback time of the video file, wherein the designated time acquiring unit acquires the designated time from within the specific time frame based on a change over time in features of image data during the specific time frame.

With the above structure, the interesting section identifying device can automatically acquire the designated time without receiving the designation of the designated time from the user, thus automating interesting section extraction.

(p) In the interesting section identifying device of (a), the interesting section identifying device may further comprise an interesting section information providing unit configured to provide interesting section information to the video file, the interesting section information relating to the interesting section identified by the interesting section identifying unit.

With this structure, the interesting section identifying device can provide the video file with information on the interesting section. This information may, for example, be used for creation of a digest of the video file, or as chapters when the video file is created.

(q) In the interesting section identifying device of (a), as the interesting section information, the interesting section information providing unit may provide the video file with a starting flag at a position corresponding to a starting point of the interesting section and/or with an ending flag at a position corresponding to an ending point of the interesting section.

With this structure, the interesting section identifying device provides a starting flag or an ending flag to the video file. Such a video file provided with a starting flag or an ending flag may be used for random access or the like during video playback.

(r) In the interesting section identifying device of (a), the interesting section identifying device may further comprise an interesting section extracting unit configured to extract, from the video file, the interesting section identified by the interesting section identifying unit.

With this structure, the interesting section identifying device can extract the interesting section from the video file. The extracted interesting section may be used for creation of a digest of the video file, for example.

(s) In the interesting section identifying device of (a), the interesting section identifying device may further comprise an acquiring unit configured to acquire a video file including a pre-designated interesting section candidate, wherein the detailed structure determining unit determines whether the detailed structure is included in a first section of a beginning portion or an ending portion of the pre-designated interesting section candidate, and the interesting section identifying unit identifies the interesting section in the video file, acquired by the acquiring unit, including the pre-designated interesting section candidate.

For a video in which an interesting section is set, this structure allows the interesting section identifying device to adjust the setting of the interesting section when, for example, the setting is not appropriate.

INDUSTRIAL APPLICABILITY

By extracting an interesting section that is a target of user interest from an audio signal of AV content that includes speech, indoor and outdoor sounds, and the like, the interesting section extracting device according to the present invention is useful as technology for editing AV content.

REFERENCE SIGNS LIST 100 video editing device
102 audio extracting device
103 content storage device
104 interesting section extracting device
105 interesting section storage device
106 interesting section extracting unit 108 Anchor Model creating device
109 interface device
130 audio data storage device
201, 301 feature vector generating unit
202 likelihood vector generating unit
203 Anchor Model accumulation unit
204 likelihood vector buffer
205 frequency vector/variance generating unit (frequency vector calculating unit, variance calculating unit)
206 frequency vector buffer
207 interesting section candidate extracting unit
208 section lengthening reference index calculating unit
209 designated time acquiring unit
210 detailed structure determining unit
211 hierarchy expansion unit (interesting section extracting unit)
302 feature vector categorizing unit
303 Anchor Model generating unit

The invention claimed is:

1. An interesting section identifying device for identifying an interesting section of a video file based on an audio signal included in the video file, the interesting section being a section in which a user is estimated to express interest, the interesting section identifying device comprising:
   an interesting section candidate extracting unit configured to extract an interesting section candidate from the video file, the interesting section candidate being a candidate for the interesting section;
   a detailed structure determining unit configured to determine whether the interesting section candidate includes a specific detailed structure, the detailed structure being a structure in which features related to a frequency of the audio signal exhibit at least a predetermined amount of variation;
   an interesting section identifying unit configured to identify the interesting section by analyzing a specific section when the detailed structure determining unit determines that the interesting section candidate includes the detailed structure, the specific section including the detailed structure and being shorter than the interesting section candidate;
   an Anchor Model storage unit configured to store Anchor Models expressing features of each of a plurality of sound types that serve as a reference;
   a designated time acquiring unit configured to acquire a designated time from the user; and
   a likelihood vector generating unit configured to calculate, for each of a plurality of first unit sections of the audio signal, a likelihood of a feature vector for each of the Anchor Models, the feature vector indicating features of the audio signal in the first unit section, and to generate a likelihood vector having the calculated likelihoods as components, wherein
   the interesting section candidate extracting unit extracts the interesting section candidate based on the likelihood vector so that the interesting section candidate includes the designated time and is longer than the first unit section, and
   the detailed structure determining unit determines whether the detailed structure is included in the specific section within a portion that includes the interesting section candidate, the specific section being longer than the first unit section and shorter than the interesting section candidate.

2. The interesting section identifying device of claim 1, further comprising
   a frequency vector calculating unit configured to calculate a second unit section frequency vector from N likelihood vectors generated from the audio signal in each of a plurality of second unit sections, each second unit section being N times longer than the first unit section, and to calculate a third unit section frequency vector from M likelihood vectors generated from the audio signal in each of a plurality of third unit sections, each third unit section being M times longer than the first unit section, where 1<M<N, and N is a multiple of M; and
   a variance calculating unit configured to calculate a variance of the third unit section frequency vectors in the third unit sections included in the second unit section, wherein
   the specific section is the second unit section,
   the interesting section candidate extracting unit extracts the interesting section candidate based on the second unit section frequency vector, and
   the detailed structure determining unit determines whether the detailed structure is included based on whether the variance exceeds a reference value.

3. The interesting section identifying device of claim 2, further comprising
   a reference index calculating unit configured to calculate a reference vector based on a plurality of second unit section frequency vectors in a reference section composed of a plurality of continuous second unit sections that include the designated time, and to assign, to the reference value, a largest one of the variances of the second unit sections included in the reference section, wherein
   the interesting section candidate extracting unit initially designates the reference section as a temporary interesting section candidate and repeats a process of (i) determining whether the second unit section frequency vector of a second unit section adjacent to the temporary interesting section candidate has at least a predetermined correlation to the reference vector and (ii) including the second unit section adjacent to the temporary interesting section candidate in the temporary interesting section candidate when determining that the second unit section frequency vector and the reference vector have at least the predetermined correlation, the interesting section candidate extracting unit terminating repetition of the process and designating the temporary interesting section candidate as the interesting section candidate upon determining that the second unit section frequency vector and the reference vector do not have at least the predetermined correlation.

4. The interesting section identifying device of claim 3, wherein
   the reference index calculating unit is further configured to calculate a threshold Euclidean distance as a Euclidean distance from the reference vector to a second unit section frequency vector having a greatest Euclidean distance from the reference vector among a plurality of second unit section frequency vectors included in the reference section, and
   the interesting section candidate extracting unit initially designates the reference section as a temporary interesting section candidate and repeats a process of (i) determining whether the Euclidean distance from the reference vector to the second unit section frequency vector of the second unit section adjacent to the temporary interesting section exceeds the threshold Euclidean distance and (ii) including the second unit section adjacent to the temporary interesting section candidate in the temporary interesting section candidate when determining that the Euclidean distance does not exceed the threshold Euclidean distance, the interesting section candidate extracting unit terminating repetition of the process and designating the temporary interesting section candidate as the interesting section candidate upon determining that the Euclidean distance exceeds the threshold Euclidean distance.

5. The interesting section identifying device of claim 4, wherein
the detailed structure determining unit determines whether the detailed structure is included in an initial second unit section or a final second unit section of the interesting section candidate, and
the interesting section identifying unit identifies a starting point of the interesting section by analyzing the initial second unit section when the detailed structure is determined to be included in the initial second unit section, and identifies an ending point of the interesting section by analyzing the final second unit section when the detailed structure is determined to be included in the final second unit section.

6. The interesting section identifying device of claim 5, wherein
when determining that the detailed structure is not included in the initial second unit section of the interesting section candidate, the detailed structure determining unit determines whether the detailed structure is included in a second unit section immediately before the interesting section candidate, and
the interesting section identifying unit identifies the starting point of the interesting section by analyzing the second unit section immediately before the interesting section candidate when the detailed structure is determined to be included in the second unit section immediately before the interesting section candidate, and designates a starting point of the interesting section candidate as the starting point of the interesting section when the detailed structure is determined not to be included in the second unit section immediately before the interesting section candidate.

7. The interesting section identifying device of claim 5, wherein
when determining that the detailed structure is not included in the final second unit section of the interesting section candidate, the detailed structure determining unit determines whether the detailed structure is included in a second unit section immediately after the interesting section candidate, and
the interesting section identifying unit identifies the ending point of the interesting section by analyzing the second unit section immediately after the interesting section candidate when the detailed structure is determined to be included in the second unit section immediately after the interesting section candidate, and designates an ending point of the interesting section candidate as the ending point of the interesting section when the detailed structure is determined not to be included in the second unit section immediately after the interesting section candidate.

8. The interesting section identifying device of claim 5, wherein
when a second unit section determined to include the detailed structure is included in the interesting section candidate, a portion of the interesting section candidate excluding the second unit section is designated as a second temporary interesting section candidate, and when the second unit section determined to include the detailed structure is not included in the interesting section candidate, the interesting section candidate is designated as the second temporary interesting section candidate, and
in a second unit section determined to include the detailed structure, the interesting section identifying unit repeats a process, for successive third unit sections starting from a third unit section closest to the reference section, of (i) determining whether the Euclidean distance from the reference vector to the third unit section frequency vector of the third unit section exceeds the threshold Euclidean distance and (ii) including the third unit section in the second temporary interesting section candidate when determining that the Euclidean distance does not exceed the threshold Euclidean distance, the interesting section identifying unit terminating repetition of the process and designating a starting point or an ending point of the second temporary interesting section candidate as a starting point or an ending point of the interesting section candidate upon determining that the Euclidean distance exceeds the threshold Euclidean distance.

9. The interesting section identifying device of claim 3, wherein
the reference index calculating unit is further configured to calculate a threshold KL (Kullback-Leibler) divergence as a KL divergence from the reference vector to a second unit section frequency vector having a greatest KL divergence from the reference vector among a plurality of second unit section frequency vectors included in the reference section, and
the interesting section candidate extracting unit initially designates the reference section as a temporary interesting section candidate and repeats a process of (i) determining whether the KL divergence from the reference vector to the second unit section frequency vector of the second unit section adjacent to the temporary interesting section exceeds the threshold KL divergence and (ii) including the second unit section adjacent to the temporary interesting section candidate in the temporary interesting section candidate when determining that the KL divergence does not exceed the threshold KL divergence, the interesting section candidate extracting unit terminating repetition of the process and designating the temporary interesting section candidate as the interesting section candidate upon determining that the KL divergence exceeds the threshold KL divergence.

10. The interesting section identifying device of claim 3, further comprising
a distinguishing unit configured to distinguish whether a target for determination of inclusion of the detailed structure is a human voice, wherein
when the distinguishing unit determines that the target is a human voice, the interesting section identifying unit recursively analyzes, in units of the first unit section, the second unit section determined to include the detailed structure.

11. The interesting section identifying device of claim 3, wherein
the detailed structure determining unit determines whether the detailed structure is included in every second unit section throughout the interesting section candidate.

12. The interesting section identifying device of claim 1, wherein
the designated time acquiring unit acquires a plurality of designated times, the interesting section identifying unit identifies an interesting section corresponding to the plurality of designated times, and the interesting section identifying device further comprises a recording unit configured to record, in an external storage device, the interesting section corresponding to the plurality of designated times in chronological order as indicated by the plurality of designated times.

13. The interesting section identifying device of claim 12, wherein
the recording unit stores the interesting section corresponding to the plurality of designated times in the external storage device as consolidated data consolidated in chronological order as indicated by the plurality of designated times.

14. The interesting section identifying device of claim 1, further comprising
a specific time frame designating unit configured to accept user input of designation of a specific time frame in terms of playback time of the video file, wherein
the designated time acquiring unit acquires the designated time from within the specific time frame based on a change over time in features of image data during the specific time frame.

15. The interesting section identifying device of claim 1, further comprising
an interesting section information providing unit configured to provide interesting section information to the video file, the interesting section information relating to the interesting section identified by the interesting section identifying unit.

16. The interesting section identifying device of claim 15, wherein
as the interesting section information, the interesting section information providing unit provides the video file with a starting flag at a position corresponding to a starting point of the interesting section and/or with an ending flag at a position corresponding to an ending point of the interesting section.

17. The interesting section identifying device of claim 1, further comprising
an interesting section extracting unit configured to extract, from the video file, the interesting section identified by the interesting section identifying unit.

18. The interesting section identifying device of claim 1, further comprising
an acquiring unit configured to acquire a video file including a pre-designated interesting section candidate, wherein
the detailed structure determining unit determines whether the detailed structure is included in a first section of a beginning portion or an ending portion of the pre-designated interesting section candidate, and
the interesting section identifying unit identifies the interesting section in the video file, acquired by the acquiring unit, including the pre-designated interesting section candidate.

19. An interesting section identifying method used in an interesting section identifying device for identifying an interesting section of a video file based on an audio signal included in the video file, the interesting section being a section in which a user is estimated to express interest, the interesting section identifying method comprising the steps of:
(a) extracting an interesting section candidate from the video file, the interesting section candidate being a candidate for the interesting section;
(b) determining whether the interesting section candidate includes a specific detailed structure, the detailed structure being a structure in which features related to a frequency of the audio signal exhibit at least a predetermined amount of variation;
(c) identifying the interesting section by analyzing a specific section when the interesting section candidate is determined in step (d) to include the detailed structure, the specific section including the detailed structure and being shorter than the interesting section candidate;
(e) storing Anchor Models expressing features of each of a plurality of sound types that serve as a reference;
(f) acquiring a designated time from the user; and
(g) calculating, for each of a plurality of first unit sections of the audio signal, a likelihood of a feature vector for each of the Anchor Models, the feature vector indicating features of the audio signal in the first unit section, and generating a likelihood vector having the calculated likelihoods as components, wherein
the extracting the interesting section candidate is based on the likelihood vector so that the interesting section candidate includes the designated time and is longer than the first unit section; and
in the determining whether the detailed structure is included in the specific section within a portion that includes the interesting section candidate, the specific section is longer than the first unit section and shorter than the interesting section candidate.

20. A non-transitory computer-readable storage medium having stored therein an interesting section identifying program for causing a computer to perform interesting section identifying processing for identifying an interesting section of a video file based on an audio signal included in the video file, the interesting section being a section in which a user is estimated to express interest,
the interesting section identifying processing comprising the steps of:
(a) extracting an interesting section candidate from the video file, the interesting section candidate being a candidate for the interesting section;
(b) determining whether the interesting section candidate includes a specific detailed structure, the detailed structure being a structure in which features related to a frequency of the audio signal exhibit at least a predetermined amount of variation;
(c) identifying the interesting section by analyzing a specific section when the interesting section candidate is determined in step (d) to include the detailed structure, the specific section including the detailed structure and being shorter than the interesting section candidate;
(e) storing Anchor Models expressing features of each of a plurality of sound types that serve as a reference;
(f) acquiring a designated time from the user; and
(g) calculating, for each of a plurality of first unit sections of the audio signal, a likelihood of a feature vector for each of the Anchor Models, the feature vector indicating features of the audio signal in the first unit section, and generating a likelihood vector having the calculated likelihoods as components, wherein
the extracting the interesting section candidate is based on the likelihood vector so that the interesting section candidate includes the designated time and is longer than the first unit section; and
in the determining whether the detailed structure is included in the specific section within a portion that includes the interesting section candidate, the specific section is longer than the first unit section and shorter than the interesting section candidate.

21. An interesting section identifying integrated circuit for identifying an interesting section based on an audio signal included in a video file, the interesting section being interesting for a user and including a designated time, the interesting section identifying integrated circuit comprising:

an interesting section candidate extracting unit configured to extract an interesting section candidate from the video file, the interesting section candidate being a candidate for the interesting section;

a detailed structure determining unit configured to determine whether the interesting section candidate includes a specific detailed structure, the detailed structure being a structure in which features related to a frequency of the audio signal exhibit at least a predetermined amount of variation;

an interesting section identifying unit configured to identify the interesting section by analyzing a specific section when the detailed structure determining unit determines that the interesting section candidate includes the detailed structure, the specific section including the detailed structure and being shorter than the interesting section candidate;

an Anchor Model storage unit configured to store Anchor Models expressing features of each of a plurality of sound types that serve as a reference;

a designated time acquiring unit configured to acquire a designated time from the user; and a likelihood vector generating unit configured to calculate, for each of a plurality of first unit sections of the audio signal, a likelihood of a feature vector for each of the Anchor Models, the feature vector indicating features of the audio signal in the first unit section, and to generate a likelihood vector having the calculated likelihoods as components, wherein the interesting section candidate extracting unit extracts the interesting section candidate based on the likelihood vector so that the interesting section candidate includes the designated time and is longer than the first unit section, and the detailed structure determining unit determines whether the detailed structure is included in the specific section within a portion that includes the interesting section candidate, the specific section being longer than the first unit section and shorter than the interesting section candidate.

* * * * *